(12) United States Patent
Brooks et al.

(10) Patent No.: US 7,311,058 B1
(45) Date of Patent: Dec. 25, 2007

(54) AUTOMATED TRIM TAB ADJUSTMENT SYSTEM METHOD AND APPARATUS

(76) Inventors: Bob Brooks, 9540 Semiahmoo Pkwy., Blaine, WA (US) 98230; Jim Mateer, 12303 434th Ave., SE., North Bend, WA (US) 98045

( * ) Notice: Subject to any disclaimer, the term of this patent is extended or adjusted under 35 U.S.C. 154(b) by 148 days.

(21) Appl. No.: 11/159,659

(22) Filed: Jun. 22, 2005

(51) Int. Cl.
*B63B 1/22* (2006.01)
(52) U.S. Cl. .................................... 114/285
(58) Field of Classification Search ......... 114/284–267
See application file for complete search history.

(56) References Cited

U.S. PATENT DOCUMENTS

| | | |
|---|---|---|
| 3,777,694 A | 12/1973 | Best |
| 4,261,278 A | 4/1981 | Gaudin |
| 4,318,699 A | 3/1982 | Wenstadt et al. |
| 4,401,888 A | 8/1983 | West et al. |
| 4,565,528 A | 1/1986 | Nakase |
| 4,718,872 A | 1/1988 | Olson et al. |
| 4,749,926 A * | 6/1988 | Ontolchik .................. 318/588 |
| 4,759,732 A | 7/1988 | Ontolchik |
| 4,908,766 A | 3/1990 | Takeuchi |
| 5,263,432 A | 11/1993 | Davis |
| 5,352,137 A | 10/1994 | Iwai et al. |
| 5,366,393 A | 11/1994 | Uenage et al. |
| 5,383,419 A | 1/1995 | Stevens et al. |
| 5,385,110 A | 1/1995 | Bennett et al. |
| 5,474,012 A | 12/1995 | Yamada et al. |
| 5,507,672 A | 4/1996 | Imaeda |
| 5,832,860 A | 11/1998 | Lexau |
| 6,273,771 B1 | 8/2001 | Buckley et al. |
| 6,354,237 B1 | 3/2002 | Gaynor et al. |
| 6,745,715 B1 | 6/2004 | Shen et al. |
| 2002/0117100 A1 | 8/2002 | Hallstensson |

* cited by examiner

*Primary Examiner*—Jesús D Sotelo
(74) *Attorney, Agent, or Firm*—Michael F. Hughes; Hughes Law Firm, PLLC

(57) ABSTRACT

A trim tab control system adapted to adjust trim tabs to optimize the velocity of a water vessel. The trim tab control system is adapted to have a tilt sensor and a velocity sensor in communication with the microcontroller where the microcontroller records the position of the trim tabs based on trim tab adjustments that the trim tab control system initiates, as well as trim tab adjustments initiated by the helmsman of the water vessel.

42 Claims, 21 Drawing Sheets

Master Loop

Master Loop Phase State Diagram

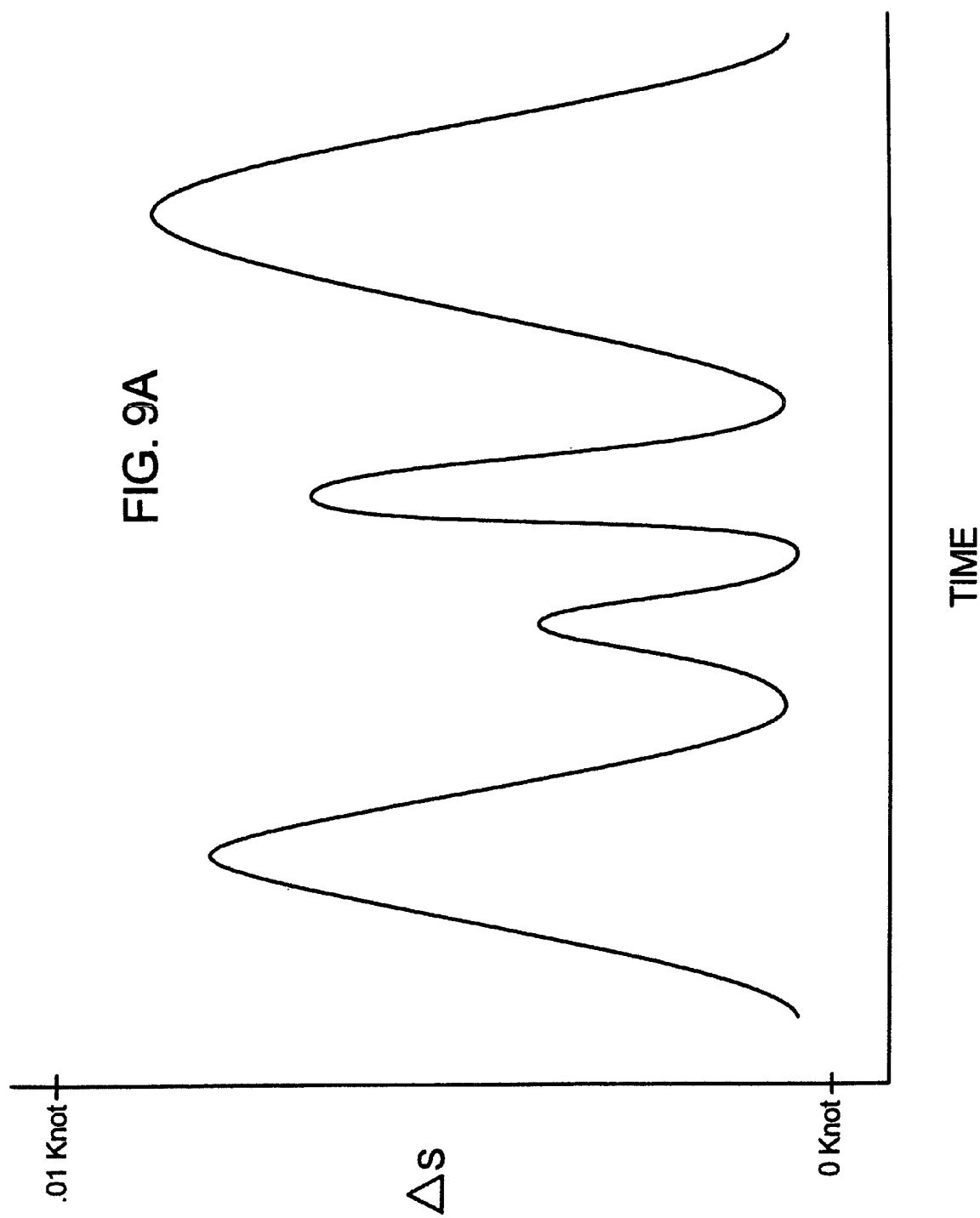

Speed_avg()

Speed_Change_Accepted()

Calc_tilt()

UART ISR

Calculate List correction

AUTOMATED TRIM TAB ADJUSTMENT SYSTEM METHOD AND APPARATUS

COMPUTER PROGRAM LISTING APPENDIX

The application hereby contains a software appendix on compact disc where the contents thereof are hereby incorporated by reference.

BACKGROUND OF THE DISCLOSURE

Trim tabs are hydrodynamic surfaces that are mounted at the aft of a motor boat near its chine's. Trim tabs are generally comprised of a rigid material and have been commercially available for many years and are generally standard equipment on most large power boats.

The position of trim tabs is often adjusted via a hydraulic or electric ram, controlled by either a joystick type switch, or rocker switches mounted at the helm. Trim tabs deflect a portion of the water passing under the hull of the vessel, changing the attitude of the hull in the water. The effect of the trim tabs is most pronounced in the pitch (fore and aft) attitude about a lateral axis, and secondly in the roll (side to side) attitude about a longitudinal axis. Trim tabs are commonly used to correct lists (roll of the boat about the longitudinal axis), and to correct 'bow up' conditions about the lateral axis but the average boater has little knowledge as to the effect this may have on their boats fuel economy or speed.

A boat hull passing through the water generates a fair amount of drag. This drag is responsible for the notoriously bad fuel mileage experienced by most power boats. Planning boat hulls are designed for a particular attitude, both in pitch and roll. By adding weight (provisions, dinghy, water, fuel, etc.) boat operators may adversely affect the factory engineered balance of the boat. A boat traveling at the attitude for which it was designed will be traveling at its most efficient attitude. Changes in water conditions, weather, and currents can alter the attitude at which the boat is most efficient. Running weight of the boat changes when passengers move about or when fuel is consumed the boats optimum attitude is affected. Because the attitude of a boat is influenced by so many factors, boat manufacturers have opted to equip boats with trim tabs, to allow operators to correct for these factors affecting boat trim.

Most operators do not monitor the boat's attitude often enough. Changing conditions can require the operator make adjustments to the trim tab positions on a continual basis. To expect a boat operator to be this vigilant to the trim tabs is simply not reasonable.

Most boat operators trim out their boat's attitude either by closely watching the vessel speed, or by simple gut instinct. Conventional wisdom dictates that for a given throttle setting, the most efficient attitude will also be the maximum vessel speed. Typically, the operator may make a small manual change to the trim tab settings, and monitor the speed of the boat. If the speed goes up, the operator may make another adjustment of the tabs, in the same direction. If the speed decreases, he might make an adjustment in the opposite direction. This process is repeated until the operator is sufficiently convinced he has achieved the best possible speed out of his boat for the given throttle position and prevailing conditions. The entire process is continually repeated due to changing water, load, and weather conditions. Of course this manual adjustment process is time consuming by the operator and given the small velocity changes of the boat and scalable variations in the time lag to acquire actionable data, the manual process is fraught with error.

Trim tabs are normally positioned relative the boat on which they are mounted by hydraulic power or by direct driven screw geared rams. Trim tabs are variable in position so as to change the attitude of the hull of a moving boat with respect to a horizontal axis and about a longitudinal axis if only one of the tabs is altered.

Trim tabs provide several useful functions as a result of being able to change the attitude of a moving boat's hull. These include (i) increased speed, (ii) improved fuel economy and reduced laboring of the boat's engines, (iii) improved forward visibility, (iv) reduction of pounding, listing, squatting, and/or wake, (v) adjustment of the boat's attitude to a position that is safer or more comfortable to the boat's occupants, (vi) minimization of bow rise when the boat comes up on plane, (vii) reduction in time and energy for the boat to reach its planning speed.

The aforementioned benefits to the boat's operation generally accrue only when the trim tabs are in the proper position. The latitude, or range, of the proper position of the trim tabs varies from boat to boat, and from time to time. The range of "proper position" may be as critical as plus or minus fractions of degrees. Meanwhile, trim tabs are typically variable through a range of greater than 25 to 40 degrees depending on the size and manufacturer. When the trim tabs are in a position that deviates greatly from optimal then they may actually serve to aggravate one or more operational problem conditions of the boat. Even when the trim tabs are positioned close or very close to optimal, the boat's speed and fuel economy may nonetheless be compromised a few percentage points from what the boat could achieve if the trim tabs are more precisely optimally positioned. Further, the trim tabs should be dynamically positioned during various operational conditions and uses of the boat.

The required control of a power boat's trim tabs may be, at times and from time to time, complex. Nonetheless to address this complexity, existing automated power trim tab control systems simply cause a boat to assume, and hold a particular attitude both fore to aft and port to starboard. Therefore more sophisticated trim control is desired to provide more functionality than simply attitudinal-position-holding.

Most marine vessels are designed so that when they are at rest in the water, the deck generally lies at a small angle (2°-4°) from the horizontal with the bow slightly higher than the stern. On power craft with planning hulls, the boat will lift out of the water as the boat gains speed. If the drive system of the boat is located under and slightly behind its center of mass, the boat will rise almost vertically out of the water, maintaining a near horizontal attitude, and the helmsman will maintain good visibility of the water ahead. However, if the center of mass of the craft is well astern of the center of the hull, then the bow will typically rise from five to thirty degrees (5°-30°) out of the water as the boat comes up on plane.

A boat with extreme bow rise obstructs the helmsman's visibility of the water ahead as the boat comes up on plane. As the boat gains speed, more and more of its bow comes out of the water until the center of gravity of the boat begins to break out of the water. At this point the boat's hull falls to its full on-plane condition. The on-plane boat typically rides from two to eight degrees (2°-8°) from the horizontal. The precise angle the boat assumes is dependent upon the magnitude and distribution of its load, and on its hull design.

A given hull design begins to plane at a predetermined speed. When the boat slows down it will go off-plane at a slightly lower speed than the speed required to place it on plane. Therefore, automatic trimming devices should take this hysteresis effect into account when implementing the automatic trimming devices. In sum, with boats there is always an "off-plane to on-plane" speed and a slightly lower "on-plane to off-plane" speed.

The present manufacturers of manually controlled power trim tabs recommend the following procedures for the proper adjustment of the trim tabs.

As the vessel accelerates, the bow will tend to rise out of the water, reducing visibility. To correct the obstructed visibility problem, the trim tabs are moved downwardly. Once the vessel is on plane, the tabs may be adjusted for optimal performance and trim (Bennett™ provides a trim tab usage demo, available on the Bennett™ trim tab web site).

Because boats and more specifically large boats such as cruisers and yachts consume fuel typically derived from scarce petroleum presently at increasing prices, it is useful to implement a method for electronically controlling boat's power trim tabs in order to improve the fuel economy of the boat.

Additionally, since large boats tend to be moored, and not often taken out of the water, it is advantageous to raise the trim tabs to their fully retracted position when the vessel is not in use. Raising the trim tabs reduces the amount of trim tab components exposed to the harsh marine environment. Similarly, on boats that are regularly removed from the water, it is advantageous to fully retract the trim tabs to prevent exposure to damage from external sources (trailers and lifts), and to protect the internal components of the trim tab rams from the environment.

SUMMARY OF THE DISCLOSURE

Described below is a trim tab control system adapted to control left (port) and right (starboard) trim tabs on a water vessel. The trim tabs are adapted to actuate up or down and the water vessel has a defined longitudinal and lateral axis. The trim tab control system comprises a microcontroller having a plurality of data input lines and output lines. There is further a control circuit adapted to actuate the left or right trim tabs where the control circuit is in communication with at least one of the output lines of the microprocessor. A tilt sensor is provided that is adapted to determine the amount of tilt about a longitudinal axis of the water vessel. There is further a velocity sensor adapted to transmit signals to a data input line of the microcontroller representing a measured velocity of the water vessel. The microcontroller is adapted to exercise logic to condition the signal received from the velocity sensor to determine a recorded velocity value that compared to a previously recorded velocity value. If the recorded velocity value is greater than the previously recorded velocity value, the trim tabs are actuated in the same direction as the previously set direction. Alternatively, if the recorded velocity value is less than the previously recorded velocity value, the trim tabs actuate in the opposite direction than the previous trim tab adjustment. The new position of the trim tabs is then saved. The position of the trim tabs is monitored by the microcontroller from the power lines which activates the trim tabs.

Present analysis indicates that there is the potential of saving up to 2 and 1 half gallons of gas consumed per hour in a twin 454-engine gasoline cruiser boats. This is a conservative estimate based on present analysis of the gas savings. Therefore, it can be concluded that if an average boater operates their vessel 100 hours a year, this will equate to 250 gallons of gas savings per year. Of course, this results in less combusted materials from the hydrocarbon fuel, less pollution, and less consumption and reliance on oil.

It should be reiterated that the fuel consumption and increase in the efficiency, given the misuse of trim tabs by any helmsman, saving fuel is paramount as far of the goal and criteria of the trim tab control system described herein.

BRIEF DESCRIPTION OF THE DRAWINGS

FIG. 9A shows a schematic example of potential velocity readings illustrating the inherent noise due to various factors;

DETAILED DESCRIPTION OF THE PREFERRED EMBODIMENTS

Figure 1:
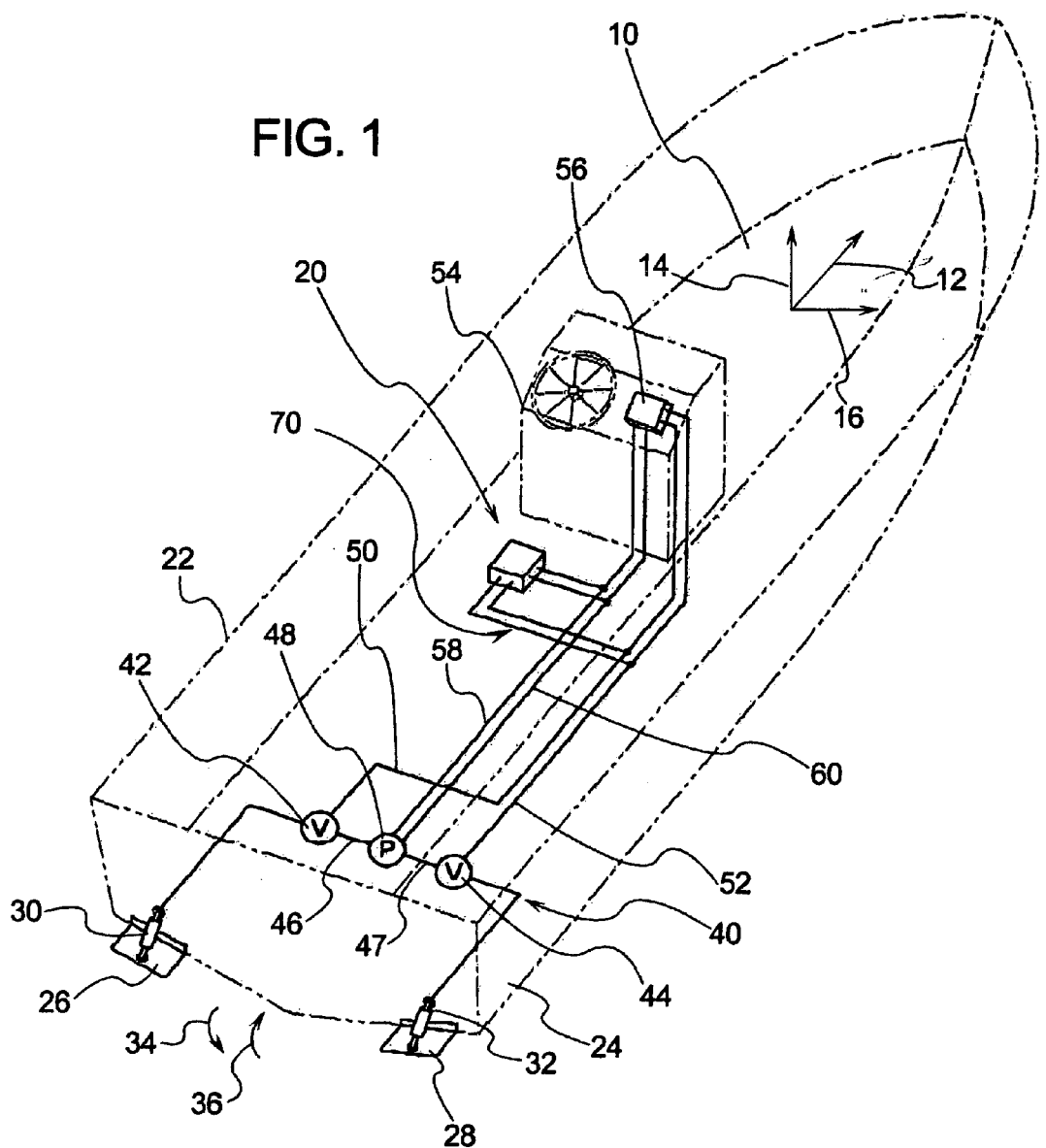
FIG. 1 shows a schematic isometric view of a water vessel showing one form of a trim tab system with one form of the trim tab control system interface therewith.

In general, the disclosure below recites a trim tab control system 20. The trim tab control system comprises various circuitry components described further herein. The trim tab control system (trim tab controller) 20 as shown in FIG. 1 is adapted to be positioned within a water vessel 22. Of course the trim tab controller is shown by a few examples herein but is broadly defined by the operations as claimed herein below. The water vessel 22 in one form is a powerboat of sufficient length and power to warrant having a trim tab system where in the transom region 24 there are first and second trim tabs 26 and 28 positioned in the left and right hand portions of the water vessel 22. The water vessel 22 is defined to have an axes system 10 shown in FIG. 1 where the axis 12 indicates a longitudinal direction, the axis 14 indicates a vertical direction, and the axis 16 indicates a lateral direction. Each trim tab has a ram 30 and 32 that is adapted to power the trim tab downwardly as indicated by arrow 34 or upwardly as indicated by arrow 36. The rams 30 and 32 in one form are hydraulic rams such as that is found in a Bennett™ system.

As shown in FIG. 1, the rams are in hydraulic communication with the hydraulic system 40. In one form, the hydraulic system 40 is controlled by electric valves 42 and 44 that provide communication to the main hydraulic lines 46 and 47 which are pressurized by a bidirectional fluid pump 48. The valves 42 and 44 are operated by electric lines 50 and 52 which in one form are 12-volt lines that are controlled at the helm 54 by toggle switches schematically shown at 56. There are additional electric lines 58 and 60 that are adapted to operate the pump 48 in either a retract or extend mode.

In general, the pump 48 is adapted to either extend or retract the trim tabs 26 and/or 28. In one form, the pump 48 is a dual rotation motor which can rotate in either direction to apply pressure to lines 46 and 47 or alternatively apply negative gauge pressure thereto. In this form, the pump 48 has two sets of electric coils where energizing either set will change the direction of rotation of the pump. As described further herein, the two sets of electrical coils have a tendency to create a back electromagnetic force (EMF) current in the coil which does not have external voltage applied thereto. The trim tab control system 20 is adapted to handle this back EMF current as described further below without giving mis-readings upon reading the status of the electrical lines.

The trim tab control system 20 is adapted to interface with the existing trim tab system of the water vessel 22. Namely, input/output lines generally indicated at 70 are adapted to read when the various electrical lines are charged and further interface with relays to energize the 12-volt (in one form) lines to operate the various valves and pump to operate the trim tabs. It should be noted and will be further described below that other embodiments for electrical screw-gear rams can be employed in other systems such as a Lenco™ system where essentially the relays directly control the rams 30 and 32 electrically without interfacing with the hydraulics or any electrical pump. This alternative embodiment is discussed further below with reference to FIG. 4.

Figure 2:
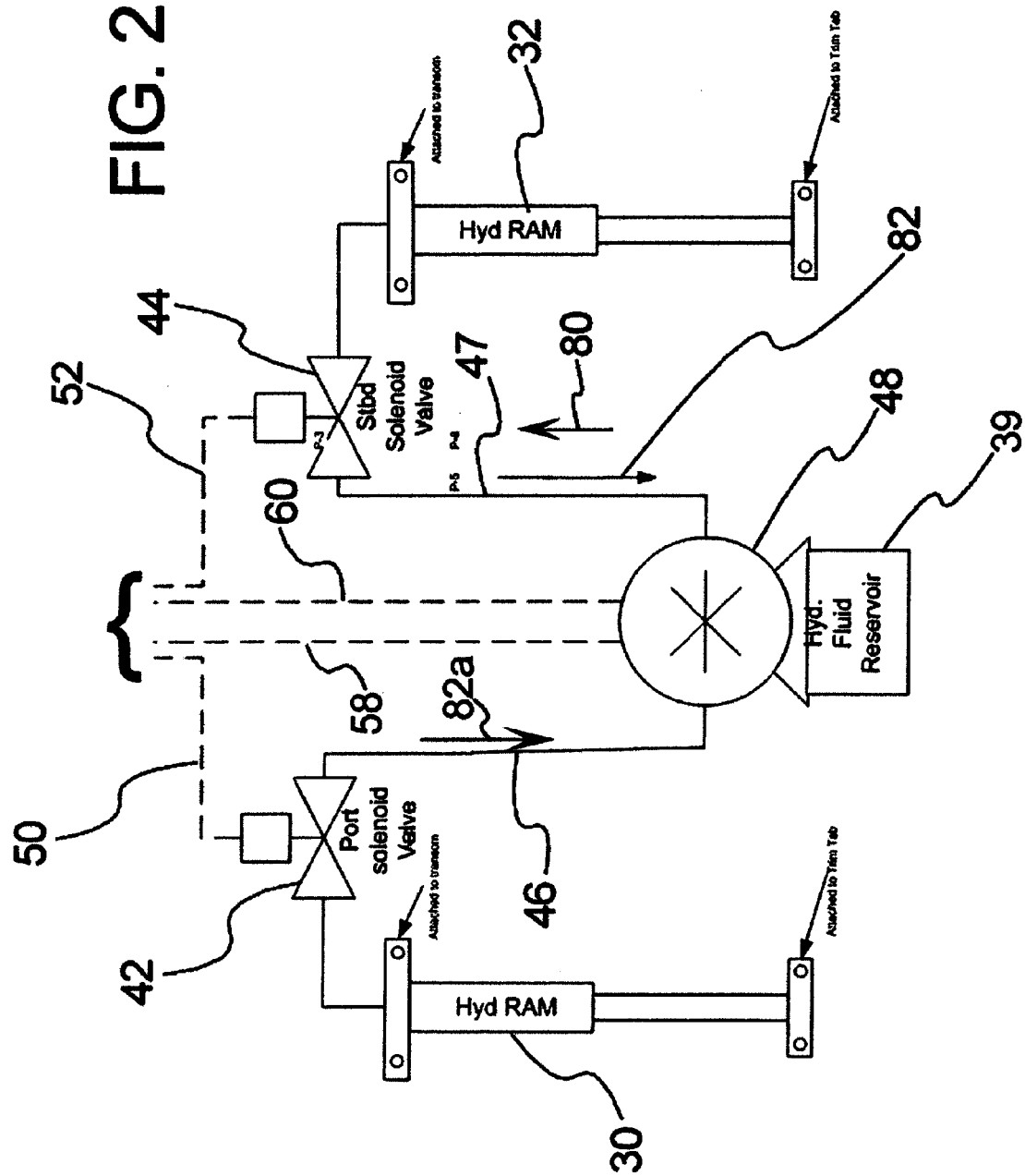
FIG. 2 shows a schematic circuit for the hydraulics and electronics of a trim tab system within a water vessel.

Now referring to FIG. 2, there is a combination of an electric and hydraulic circuit schematic which is now described in greater detail. FIG. 2 is a essentially schematic illustration of the hydraulic and electric circuitry as shown in FIG. 1. It should be noted that the hydraulic rams 30 and 32 actuate to extend and retract the trim tabs. Essentially, the four electrical lines 50, 52, 58 and 60 provide power to operate the solenoid valves 42 and 44 and the direction (up/down) of the pump 48 respectively. The pump is adapted to apply pressure and direct flow in the direction indicated at 80 through lines 46 and/or 47 where the flow passes through to solenoid valves 42 and/or 44. Alternatively, the flow can be reversed to retract either or both hydraulic rams 30 and 32 where the pump reverses direction and the flow will occur in a direction indicated by arrow 82 where hydraulic fluid will pass through either solenoid valve 42 and/or 44 to retract the hydraulic rams. It should be reiterated that the flows indicated at 80 and 82 occur in a mutually exclusive fashion in lines 46 and 47. In the Bennett™ system, in one form the pump 48 has two outlet ports which are provided as a matter of convenience to supply fluid to lines 46 and 47. However, it should be noted that these two lines are essentially in the same fluid circuit and will flow outwardly or inwardly based upon the direction of the pump 48 (depending upon activation of the valves 42 and 44). The pump further is adapted to extract fluid from the fluid reservoir 39 when extending the rams 30 and 32 or pull fluid from the rams, creating a negative gauge pressure therein and pumping the fluid to the fluid reservoir 39.

Figure 3:
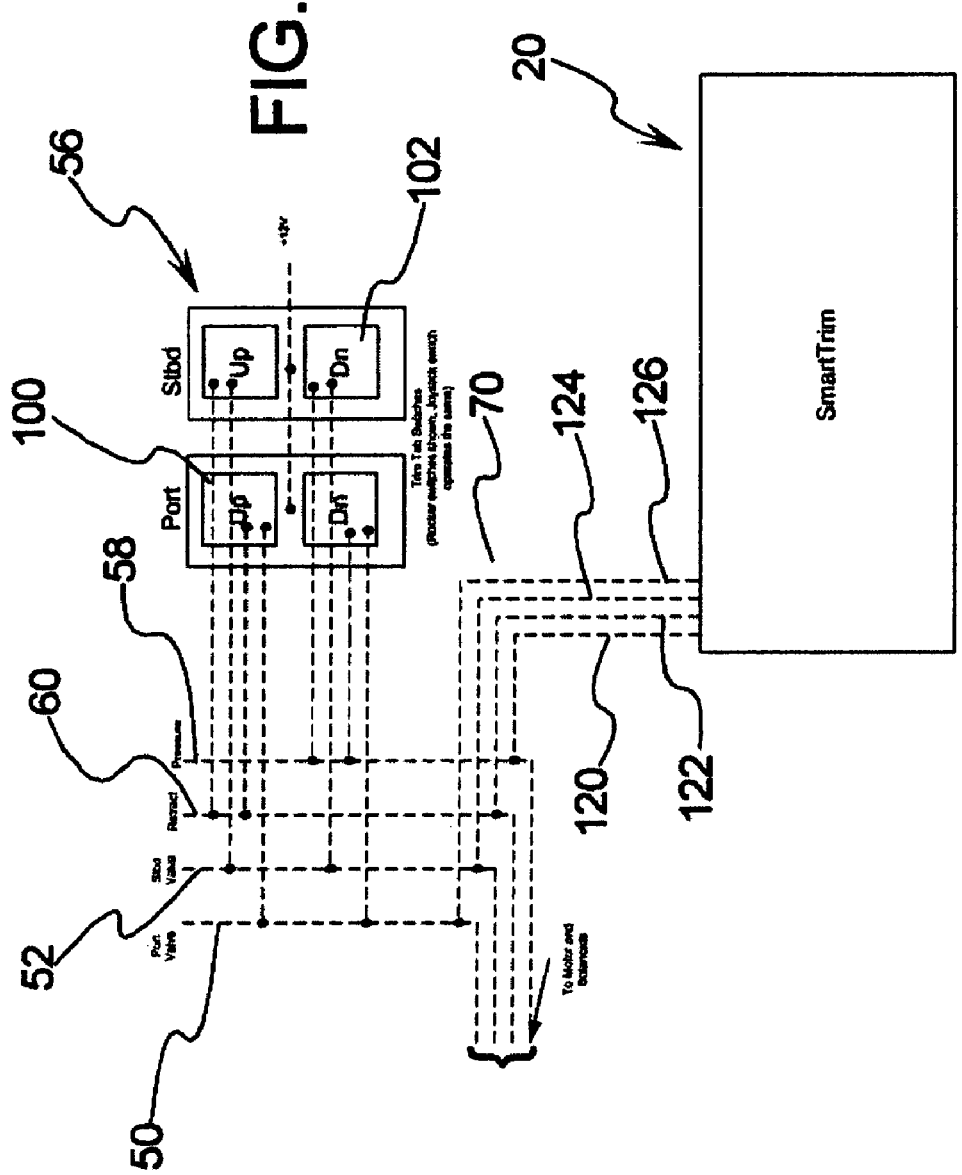
FIG. 3 shows an electrical circuit of the trim tab control system interfacing with the various electrical control lines that are operatively connected to a set of toggle switches.

Now referring to FIG. 3, the toggle switches 56 are shown for the existing manual controls where the toggle switches 56 work in combination to operate the valves and the pump for activating the hydraulic rams 30 and 32 (FIG. 2). For example, when the port side up button 100 is pressed, the electric lines 60 and 52 are in communication with a voltage supply (12 volts in one form) and the flow of the fluid will retract toward the pump 48 (see FIG. 2) as indicated by flow line 82 and the starboard solenoid valve 44 will open causing the hydraulic fluid to flow from the hydraulic ram in the direction indicated at 82a for retraction of the starboard trim tab. Alternatively, for example when the starboard down button indicated at 102 is depressed, the lines 58 and 50 are energized whereby the pump is adapted to operate flowing hydraulic fluid as indicated by arrow 80 in FIG. 2 where the port solenoid valve 42 opens to extend the hydraulic ram and lower the port trim tab thereby lowering the starboard bow. Of course similar operations occur with the starboard up and port down buttons, and it should be noted that the up and down buttons are generally either a rocker switch or joystick type of interface. An advantage of the joystick type of control is that it prevents the simultaneous engagement of both the pressure and retract coils on the hydraulic pump (lines 58 and 60).

Now referring to the lower right hand portion of FIG. 3, there is shown output lines 120, 122, 124, and 126 that are in electrical communication with lines 50 (the port valve), 52 (the starboard valve) 60 (pump retract), and 58 (pump pressurize) respectively. Therefore, it can be appreciated that in a preferred form the trim tab control system 20 interfaces with a trim tab system on a boat by tapping into the electrical lines for the pump and valve controls.

Figure 4:
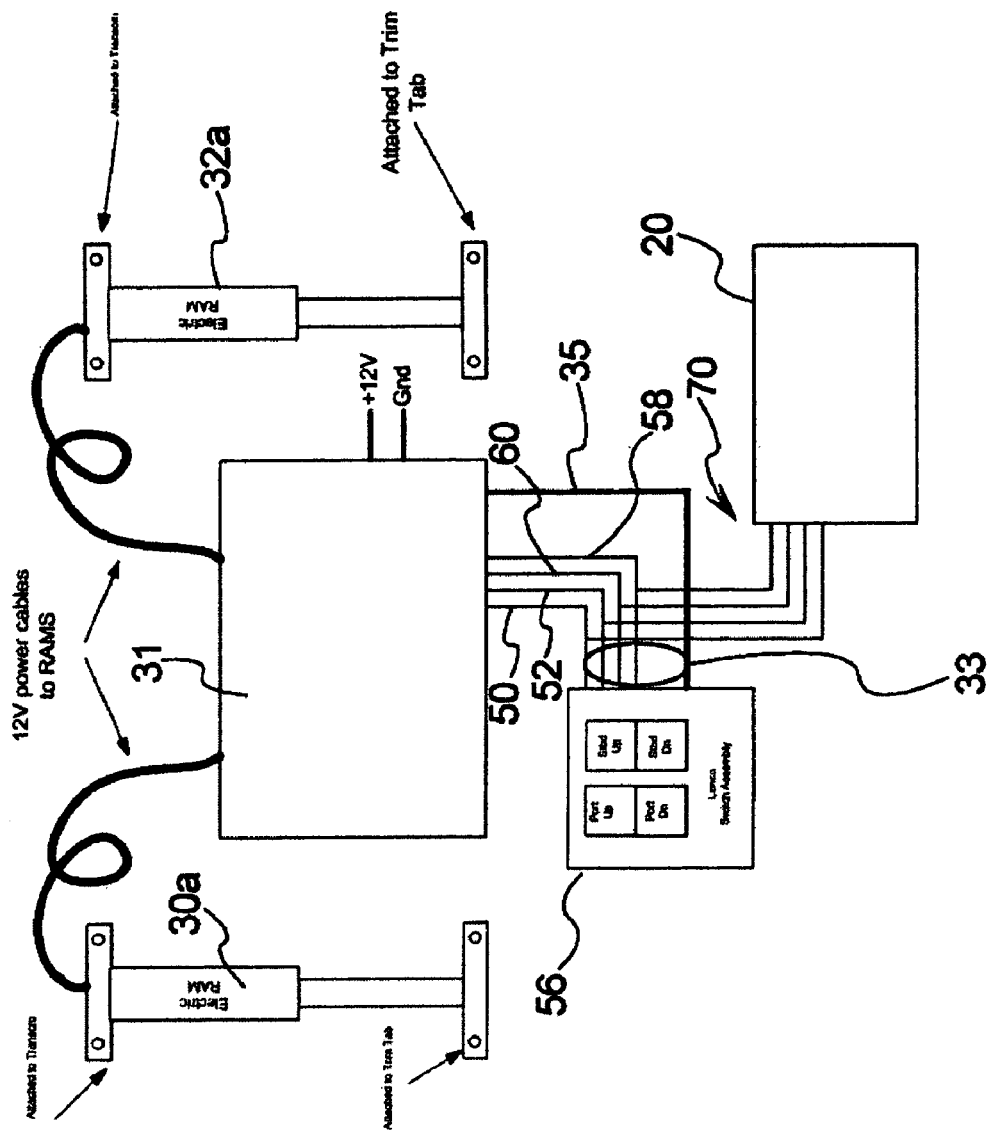
FIG. 4 shows an alternative trim tab system where trim tab rams are electrically driven by a control box.

There will now be a description of an alternative existing infrastructure for trim tabs which is presently manufactured by Lenco™, with reference to FIG. 4. In general, this system is somewhat similar to the system as shown in FIGS. 2 and 3; however, instead of hydraulic lines, the left (30A) and right rams (32A) are direct-drive electrical devices. These devices are controlled by a control box indicated at 31. However, the trim tab control device 20 operates in a similar manner where the electrical wires generally indicated at 70 will interface with the four main electrical wires 50, 52, 58, and 60 which are in electrical communication with the control box 31. With the Lenco™ system at the time of writing, a ten-wire switch harness 33 is provided between the toggle switch area 56 and the control box 31 where the main electrical wires of interest 50, 52, 60, and 58 are separated and the remainder of the ten-wire switch harness is schematically indicated 35.

It should be noted that the trim tab control system is adapted to be positioned on new boats employing the systems of Bennett™, Boat Leveler™, or Lenco™ or be a retrofit to boats having these systems or substantial equivalent. The trim tab control system is defined to be operable in other types of trim tab infrastructures and are not limited to these particular brand-name installations. As will be now appreciated herein, the trim tab control system is adapted to be extremely versatile in interfacing with various types of control tab infrastructures.

Figure 5:
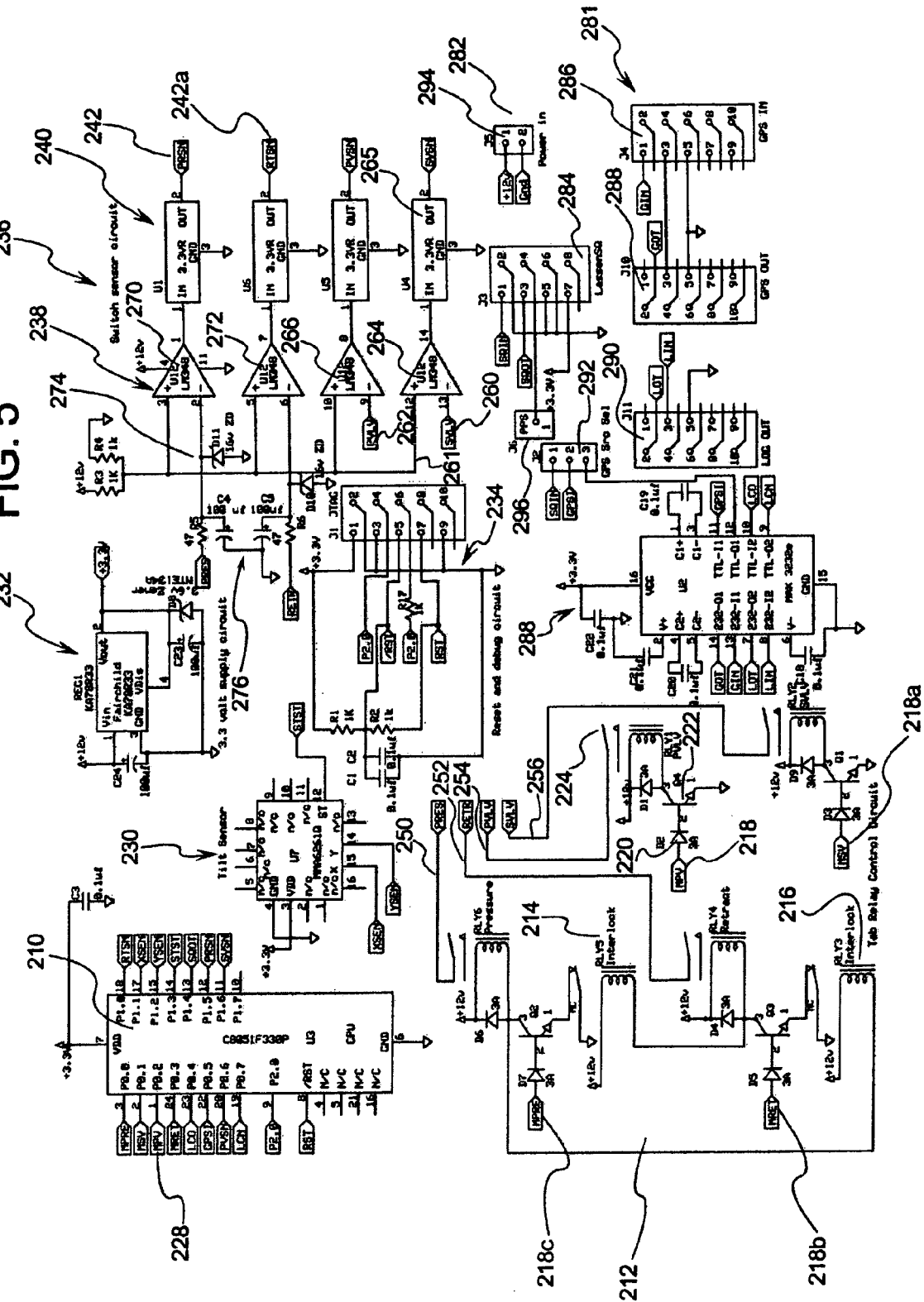
FIG. 5 shows a circuit schematic of one form of a trim tab control system.

Now referring to FIG. 5, there is a schematic circuit diagram of the trim tab control system which is now described in detail. As shown in FIG. 5, there is a microcontroller 210, a relay control circuit 212, a tilt sensor circuitry 230, a power supply unit 232, a switch sensory circuit 236, and an interface circuitry generally indicated in the lower right-hand portion at 281 which interfaces external signals to the microcontroller 210.

In general the relay control circuit 212 operates the trim tabs and is adapted to interface with the electrical lines operating the same. The interlock relays 214 and 216 in particular are adapted to ensure that the hydraulic motor does not operate in a manner where both coils are simultaneously energized, which would create an unpredictable and undesirable situation. The pin 218 is connected directly from the processor protected by a diode 220 and drives the transistor 222 which provides a ground path for the coil 224 of the relay.

The tilt sensor circuitry 230 essentially produces an analog signal between 0.5 and 2.5 volts in $\frac{1}{100}$ of a volt increments in one form, correlating the voltage output to the orientation about the longitudinal axis of the vessel.

The power supply unit 232 receives the 12-volt direct current and converts it to a 3-volt direct current. The area indicated at 234 is a programming and debugging header where it is essentially a port allowing interface to the microcontroller 210. The switch sensory circuit 236 has an array of comparators 238 as well as voltage converters 240 that are adapted to communicate with the various array of ports 242 that are in direct communication with the microcontroller 210. In general, the switch sensory circuit 236 has a main function of simply interfacing back to the microcontroller 210 whether the trim tabs are going upward or downward. This upward or downward motion can be instigated by the helmsmen directly powering one of the lines 50, 52, 58 and 60 as shown in FIGS. 2-4, through the use of the manual trim tab switches 56 which correlate to the lines 254, 256, 252, and 250 as seen in the middle left portion of FIG. 5. The input lines indicated at 256 and 254 are essentially attached to the comparator circuits 264 and 266 whereby the comparator circuits produce a Boolean signal of 1 or 0. If, for example, 256 is energized which correlates that line 256 is at a higher voltage than the input pin indicated at 261, then a negative signal (0) is placed to the circuit 265. This signal relays back to the microcontroller 210 to indicate that this tab is being moved and this movement is recorded therein. It should be reiterated that in certain pump motors, there are actually two coils mechanically within the motor whereby they are energized disjunctively for rotating the pump forward or backward for retraction or pressure. However, by having two coils operating in the fixed magnetic field, the non-functioning coil in the motor incurs inductance where a back EMF current is passed through the non-activated coil. In one form, it has been found that a 12-volt motor operating one of the coils produces approximately a 9-volt inductance current in the wire coil by the motion and magnetic field flux cutting the passive opposing coil. Therefore, the OP amps indicated at 270 and 272 must contend with this voltage to not provide false readings to the microcontroller with regard to the activity of the pump. It should be noted that the back EMF current is creating the approximate 9-volt voltage in the other non powered motor line (either 58 or 60). When the microprocessor turns off the motor, there is still a certain amount of rotational inertia and voltage created in that line. This could be misrecognized as a manual switching at the helm of the trim tabs. Therefore, the circuitry delays any readings from the pressure line for a certain increment of time to not record a potential misreading.

To contend with back EMF current, there is a clamp indicated at 274 and an RC filter 276, that are adapted to allow for a comparator between a 9 and 12 volts in one form, thus removing all of the spikes and various noise that occurs with this dynamic acceleration of cutting flux fields in the motor. It should be noted that the circuitry 236 essentially is adapted to provide the microcontroller 210 information whether the tabs are moving downward or upward. Thereafter it is up to the microcontroller 210 to have the internal logic to determine and compare whether the trim tab control system 20 initiated the movement, or the trim tab movement was a manual override where the microcontroller will record such manual inputs.

Figure 6:
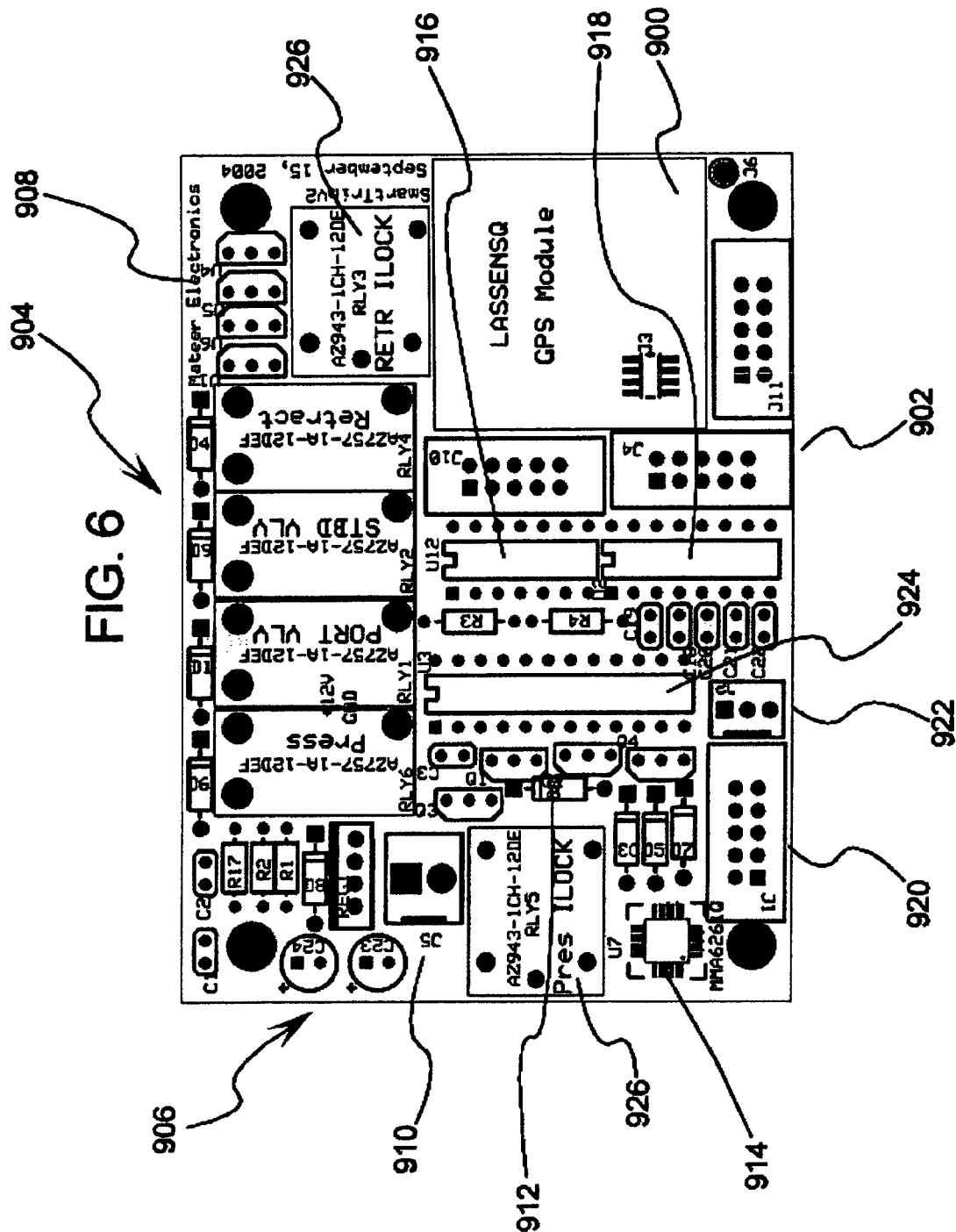
FIG. 6 shows one form of actual components as a circuit layout.

The interface circuitry 281 generally comprises various interface ports to communicate with the internal circuitry of the trim tab control system 20. The circuitry 288 in the lower middle portion of FIG. 5 is an RS-232 level converter which acts as a communication buffer. Located in the lower-right-hand portion indicated at 282, there is an array of ports. The port 284 is for an optional onboard GPS unit. Port 286 is adapted for an external GPS input. The port 288 is a NMEA-data GPS output for a preferred GPS language and protocol to be utilized. The port 290 is a log output to an optional computer. There is further a set of jumper arrays 292 to indicate whether the system will employ an external or internal GPS. The port 294 indicates a 12-volt power input to run the unit. One item which is not presently utilized in the current embodiment is a synchronizing output 296 for GPS purposes. FIG. 6 shows the layout of all of the various components in FIG. 5 now described herein.

Now referring to FIG. 6, which depicts the positioning of the components on the trim tab controller printed circuit board. These correlating components are listed herebelow.
- 900 indicates the optional on-board GPS module that will receive broadcast GPS satellite signals and output NMES 0183 data indicating speed and position.
- 902 indicates the interface connectors for external GPS input, GPS NMEA 0183 data output, and log data output.
- 904 indicates the 4 relay circuits for driving either the pump pressure, pump retract, starboard valve, and port valve (Bennett™ and Boat Leveler™ systems) or port up/port down/stbd up/stbd down (Lenco™ systems).
- 906 indicates the power supply circuit that accepts a 12+ input (+−3v) and produces a 3.3V output voltage.
- 908 indicates 240 of FIG. 5.
- 910 indicates the +12v and ground input connector (+−3v).
- 912 indicates the relay drive circuits, or the transistors and diodes indicated by 212 FIG. 5.
- 914 indicates the tilt sensor indicated at 230 FIG. 5.
- 916 indicates the op-amp portion of the circuit indicated at 236 of FIG. 5.
- 918 indicates RS232 input/output data buffer indicated at 288 of FIG. 5.
- 920 indicates the debug/programming port indicated at 234 of FIG. 5.
- 922 indicates the jumper used to select an internal or an external velocity input data source.
- 924 indicates the microcontroller indicated at 210 of FIG. 5.
- 926 indicates the interlock relays that prevent the simultaneous operation of pressure and retract coils in the hydraulic pump by the trim tab controller system indicated at 216 of FIG. 5.

Figure 5A:
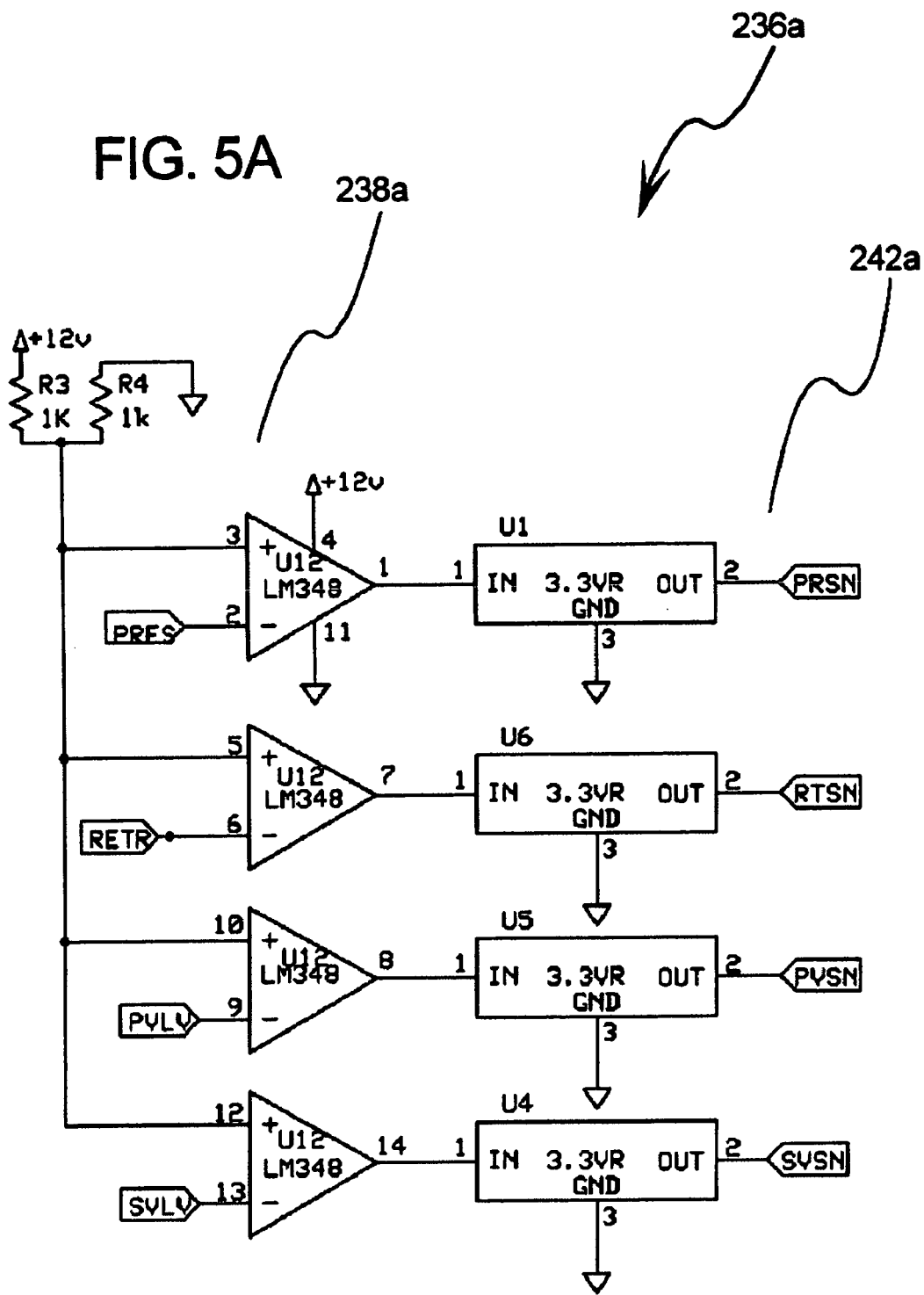
FIG. 5A shows an alternative switch sensory circuit adapted to be employed for the trim tab system as shown in FIG. 4.

Now referring to FIG. 5A, the switch sensory circuit 236a is shown which is adapted to replace the switch sensory circuit 236 as shown in FIG. 5. This circuitry is adapted to interface with the system shown in FIG. 4, which removes the hydraulic circuitry and pump and replaces it with the direct electrical gear-driven rams 30a and 32a. The switch sensory circuit 236a operates in a similar manner where it essentially transforms the volts from the 12-volt line (or operating voltage of the trim tab system) to a voltage which the microcontroller 210 is adapted to receive at port 242*a*. In this scenario, a back EMF current from an electric drive motor is not present, so the filtering system 276 shown in FIG. 5 is not needed to be present in this embodiment. The OP-amps indicated at 238*a* are adapted to detect a voltage current in the lines 50, 52, 58, and 60, (see FIG. 4) and transfer and submit a corresponding appropriate voltage acceptable by the microcontroller 210 for processing of the internal logic for recording movement of the trim tabs which is described in detail below.

With the foregoing technical description of the various hardware components of the trim tab control system 20, there will now be a general description of the logic exercised by the microcontroller 210 for operating the trim tabs. Thereafter, there will be a detailed description of the various functions shown on FIG. 7 with reference to the remaining logic diagram figures.

The software code for the preferred form of carrying out the invention is included in the software appendix, which is incorporated by reference and part of this disclosure. Of course, the software code is one preferred method of carrying out the invention and is not limited to the specifics of that source code. For example, there are a variety of programming tools to carry out additional logic, and as shown in the software appendix, certain preferred methods were chosen by the inventor. However, the logic shown herein and claimed is to be construed in the broadest sense of carrying out the invention without specific limitation to the specific programming tools for carrying out the logic described below and herein claimed.

Figure 7:
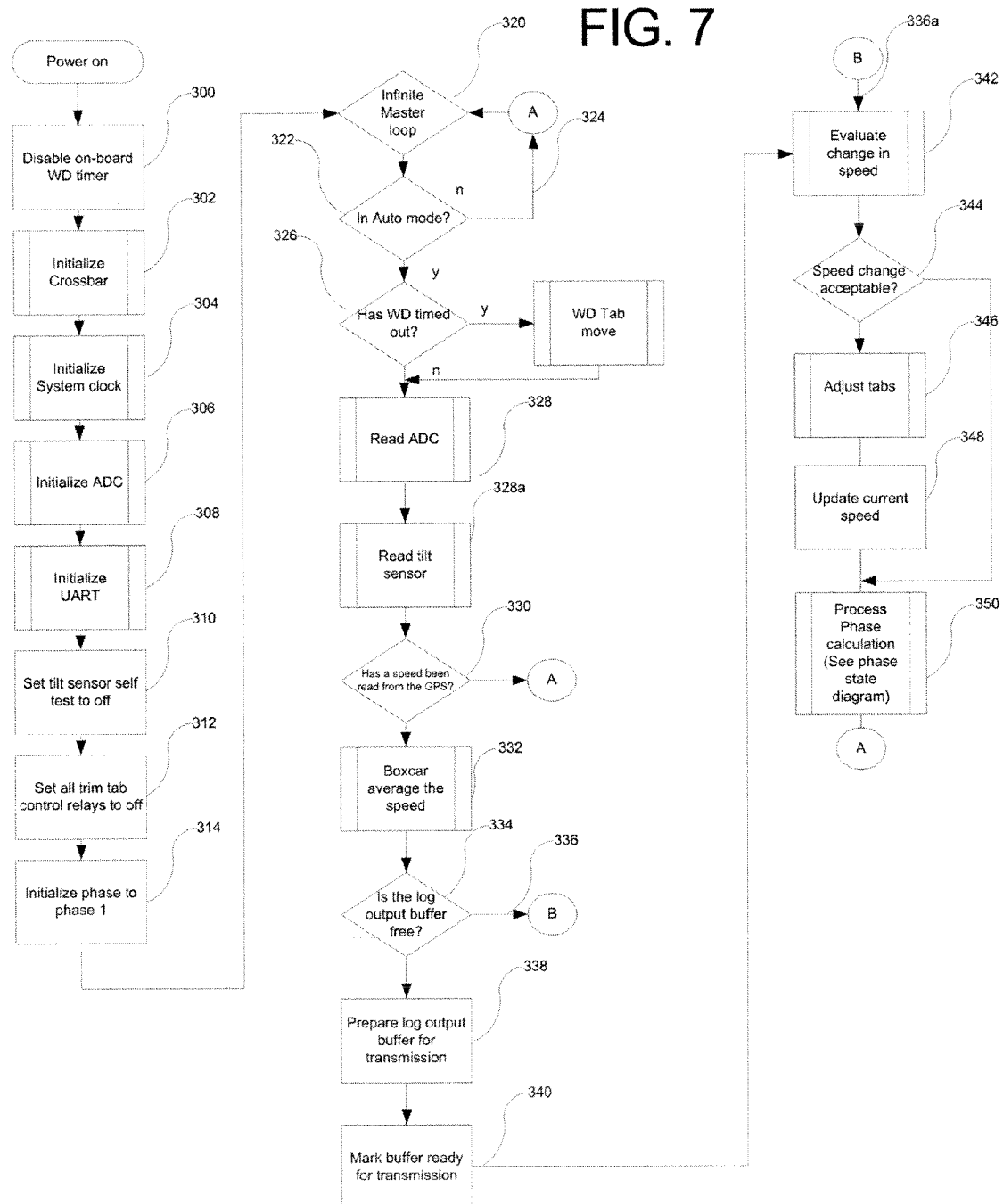
FIG. 7 shows a master loop executed by the trim tab control system.

FIG. 7 shows the master loop which in one form is coded in C as shown in the software appendix. The first step 300 is a disabling of the chip watchdog timer. The chip watchdog timer is a different watchdog-type timer described below which relates to altering the tabs at an extended time interval to attempt to bring the vessel out of a false summit. After the chip watchdog timer is disabled, there is an initializing of the crossbar that sets up all the in-out ports in step 302. The step 304 sets up the system oscillator, which is the internal clock to drive the microcontroller 210. Following setting up the system oscillator, there is an initialization step 306 of the analog digital converter for the tilt sensor. The Universal Asynchronous Receiver Transmitter (UART) in step 308 is then initialized for all of the serial communications. The step 310 turns off a bit on the tilt sensor for operation of the same. Then the trim tab control relays are all set to off as indicated in step 312. The initial phase state is set up in step 314 and that completes the initialization process.

Following initialization the code is in the main loop indicated at 320. In general, the main loop will endlessly loop in a cycle while the system is in operation. The first step 322 detects whether the trim tabs are in automatic mode. If the system is in the proper phase (automatic mode phase as described below), then the code will continue. If there is not an automatic mode the path 324 is followed where it infinitely loops until the velocity of the boat is proper to have the trim tab system automatically have fine manipulation of the trim tabs. The next step 326 determines whether a watchdog timer is invoked which is an internal routine that has various functions for optimizing the boat's false velocity peaks as described below. Thereafter, the tilt data sensor is read as indicated in step 328. The tilt sensor essentially will give a voltage back to the microcontroller whether indicating by an analog signal how much is rotated about the longitudinal axis 12 of the vessel 22 (see FIG. 1). The decision indicated at 330 essentially will repeat the loop unless there is a reading from the velocity sensor. When there is a reading from the velocity sensor there is a box car averaging indicated at 332 (described in detail as well below), where essentially the previous three and following three velocity readings are all utilized to take out localized peaks within the measuring to smoothen out the velocity data input.

The step indicated at 334 checks if the output buffer is available, and hence meaning that the buffer is not being accessed whereas if the code were to write to the buffer during a data transmission, data corruption could occur.

At step 342, there is an adaptive algorithm to determine if an acceptable speed change has occurred, where if the speed is changing every second, the speed change has to be larger than a preset value to be valid. The main goal of the selective speed value selection is to filter out spurious speed change readings. The goal of this step is to reflect the result from the last movement of the tabs to determine whether the last movement increased or decreased the speed of the boat due to the tab relocation. If the speed change is not acceptable as indicated in decision 344, the code loops back to the start of the main loop at 320. If the speed change is acceptable producing an actionable velocity value, the tabs are adjusted as indicated at 346. A tab adjustment is made pursuant to the logic shown in FIG. 10 (described in detail below). Thereafter, the speed value is saved at 348 within the memory location.

The step 346 in FIG. 7 adjusts the tabs in a manner conforming to logic described below. It should be noted that the adjustment of the tabs is contingent upon the present phase of the trim tab control system, which relates to the velocity of the water vessel.

In general, there are various phases that are utilized as a variable for various conditional logic statements to dictate the control of the trim tabs.

The phase value is a global variable within the code which indicates one of a plurality of speed ranges the water vessel is in to use in a conditional logic form to determine whether the trim tabs should be altered or otherwise positioned to certain orientations (e.g. all the way up or all the way down).

Figure 8:
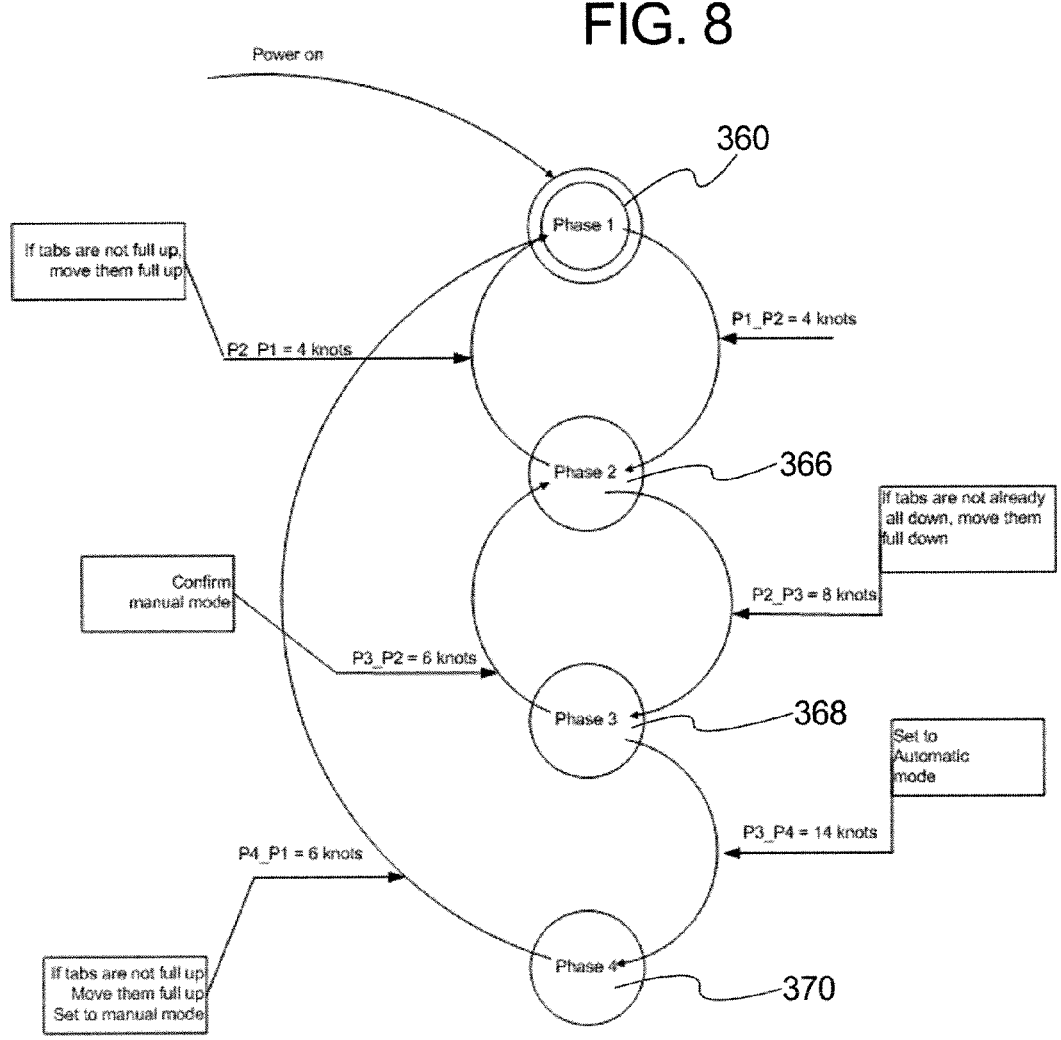
FIG. 8 discloses a phase diagram illustrating various states of a water vessel trim tab control system at various velocities.

Now referring to FIG. 8, phase 1 indicated at 360 is essentially a state where the vessel is not moving or is moving very slowly. In phase 1, the tabs should be all the way up. The system 20 is first initialized to phase 1.

Transitions between phases are triggered by preselected vessel velocities. Phase 1 is below a first value which in one form can be less than 4 knots. As the speed increases to a first value of say 4 knots, then the state of the system is at phase 2 indicated at 366. Phase 2 is essentially a buffer phase where if the vessel is already in phase 1 it will remain there, and if it is already in phase 3 it will remain in phase 3 unless there is a significant velocity change to set the state back to phase 1.

Phase 3 (planning phase) is set at a prescribed speed where the tabs are pushed all the way down where a full tab deployment occurs. Phase 3 is invoked when the speed is above a prescribed second speed of say 8 knots and will not go back to phase 2 until the speed drops below a lower prescribed speed such as 6 knots. The main function of phase 3, indicated at 368, is to get the boat positioned up "on plane." Further, the internal code within the unit does not have any input from the tilt sensor. Now when the speed increases to phase 4 (automatic mode phase) indicated at 370, the trim tab system is in full operation and the routine 320 as shown in FIG. 7 is employed in the right-hand portion of FIG. 7.

It should be noted that there are many factors to note for the exact position of the tabs for optimum speed such as wind, load (which changes as the fuel is consumed and cargo or passengers are changed); therefore the actual position isn't as relevant as finding the relative locations adjacent to such positions for the optimum speed. Further, because of the consumption of fuel, wind changes, current changes, etc., constant adjustment of the trim tabs is necessary for optimum velocity. Of course, the optimum velocity, for a given throttle setting, indicates optimum fuel efficiency. Further, it should be noted that switching from phase 3 to phase 4 in one form the positional units are decremented a certain value, such as 10 position units to get closer to the optimum trim tab position. The maximum down position bringing the boat up on plane is not close to the optimum position. Therefore, retracting the tabs a certain amount is useful to automatically place the trim tabs closer to this such position.

It should be further noted that the calibration step in one form is detecting the tabs going all the way down, or more specifically, just turning on the motor and valves so there is constant pressure to have them forced all the way down. One such preferred form of placing the trim tabs all the way down is by "nudging" the trim tabs down where the motor is turned on in discrete time increments, which is easier on the motor in by invoking this pulsation-like effect. Given the inherent fluid capacitance of the line, present analysis indicates that nudging may have an desirable effect where if the trim tabs are all the way down, the pressure buildup in the fluid lines will backflow to some degree to not overstress the motor. Nudging is also recommended by many manufacturers of trim tab systems as to not overstress the hydraulic motors.

There will now be a discussion of the various steps in FIG. 7 with reference to further logic flow diagrams to illustrate the preferred form in greater detail.

Figure 13:
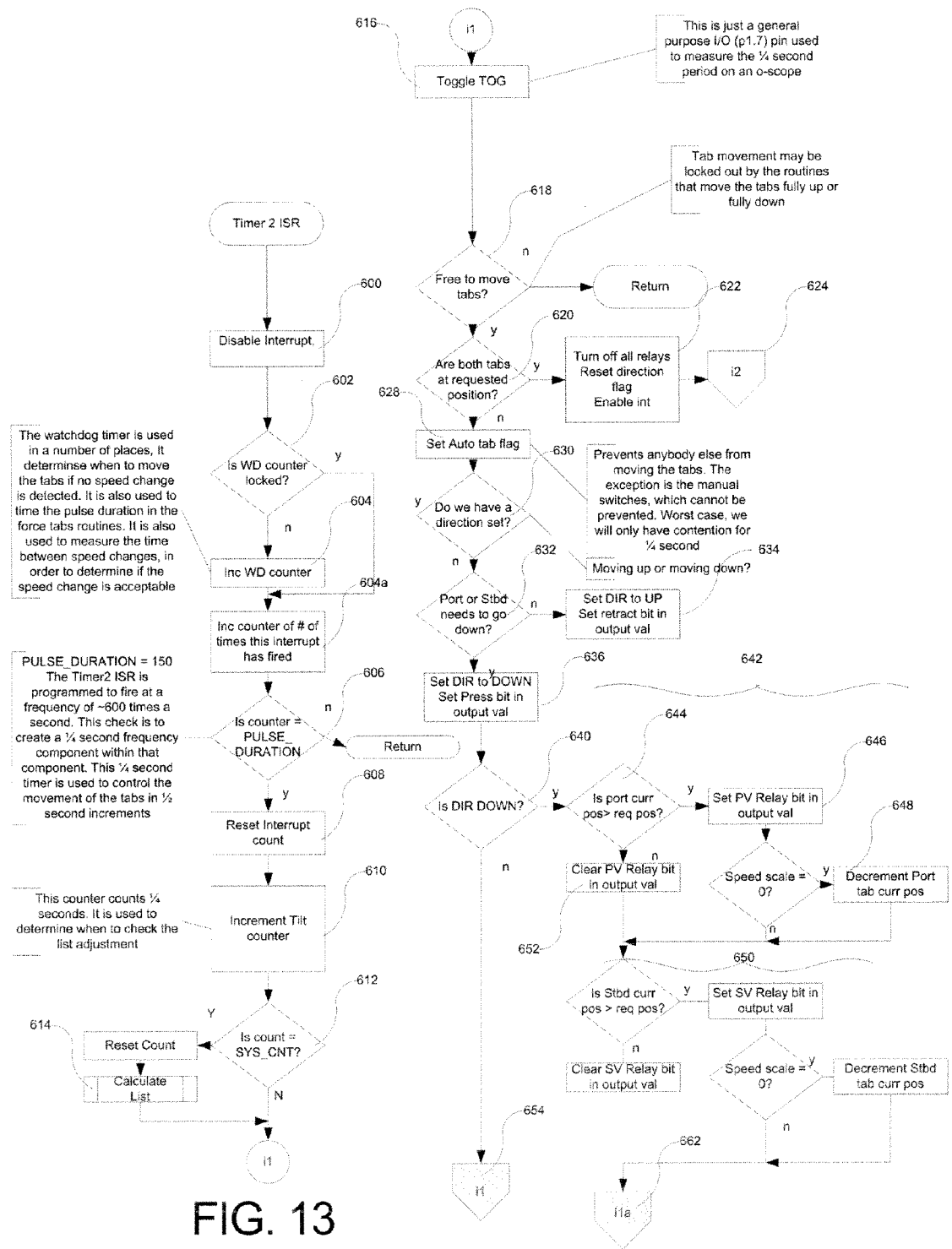
FIG. 13 shows the trim tab positioning interrupt service routine, or the Timer 2 ISR routine which determines if the tabs are being moved by manual switches and tracks movement of the same and checks request pointers to determine if tab movement should be executed.
Figure 14:
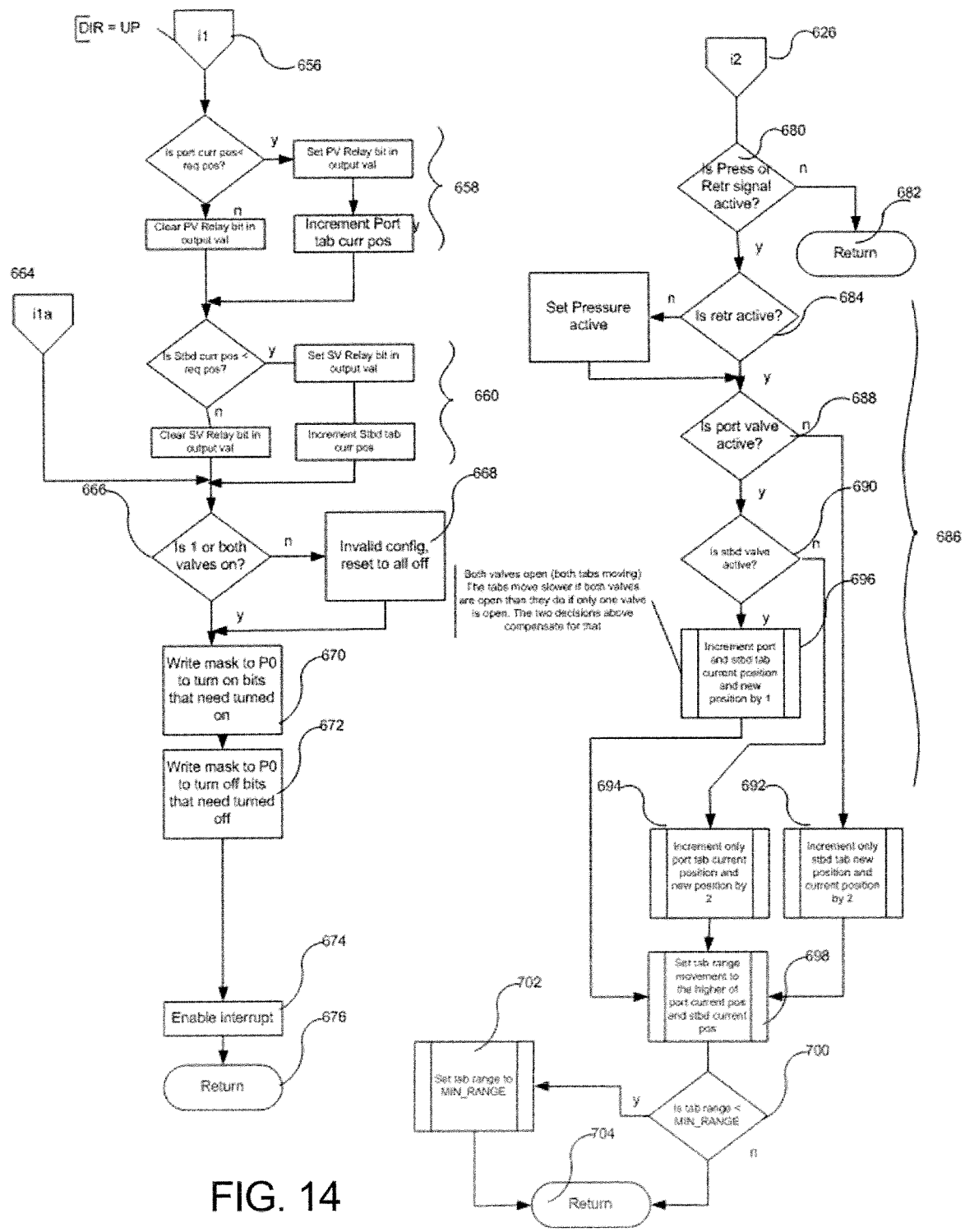
FIG. 14 shows the continued logic from the lower right hand portion of FIG. 13.

As introduced above, the step indicated at 326 essentially measures the amount of time since the last acceptable speed change by counting the number of times an internal timer (Timer 2) has fired as shown in FIGS. 13 and 14.

More specifically, the watchdog timer is invoked to ensure that the vessel is not traveling at a false peak velocity whereby a slight change in either direction of velocity may increase the velocity of the water vessel beyond such a false velocity summit. When no speed change has been detected by the watch dog timeout for a programmable period of time (e.g. 75 seconds), the function shown in the software appendix wd_move_tabs( ) is called to bump the tabs in the direction they were last repositioned. The boat speed may decrease slightly, forcing the normal tab movement routine to move them back to their original position. If the vessel speed does not decrease, then the previous tab positions were in a false peak, and were not in the proper position to maximize vessel speed. This routine also resets the watchdog count.

The Timer 2 routine provides the timer routines for the watch dog timer, the tilt sensor, and trim tab movements and the various steps are shown in FIGS. 13 and 14.

In one form, the ISR fires at approximately 600 HZ. The watchdog timer is incremented in every call to the Timer 2 ISR. Therefore a watchdog timeout count at 45000 will provide a watchdog timeout at approximately every 75 seconds. Any other conditions that cause the logic to change the tab positions, such as an acceptable speed change, will reset the watchdog count. It should be noted while discussing the timing of events that in one form the trim tab control routine is executed every $150^{th}$ firing of the ISR, or at approximately a 4 HZ (¼ second) rate. Further, the tilt calculation is executed every $128^{th}$ pass of the trim tab routine in one form, or approximately every 32 seconds.

After the code detects the watchdog timing, the tilt sensor is measured as indicated at box 328 of FIG. 7. As shown in detail in FIG. 16, the tilt sensor outputs an analog voltage between 0.5v and 2.5v depending on the inclination of the sensor. Approximately 1.25v indicates a level water vessel in one form. This voltage value varies based on the actual placement of the tilt sensor on the controller printed circuit board, and the mounting position of the controller within the boat. The analog signal is fed to the on-chip ADC (Analog to Digital Converter) and converted into a binary value. Because of the sensitivity of this sensor and the instability of the operating environment, in one form the readings are doubly averaged to give a more stable average tilt position that can be acted upon. More specifically referring to FIG. 16, the step indicated at 328 in FIG. 7 is invoked where the details of this step 328 are shown in FIG. 16 and described in detail in the software appendix under the function calc_tilt ( ) and shown schematically by the flow chart in FIG. 16.

Figure 16:
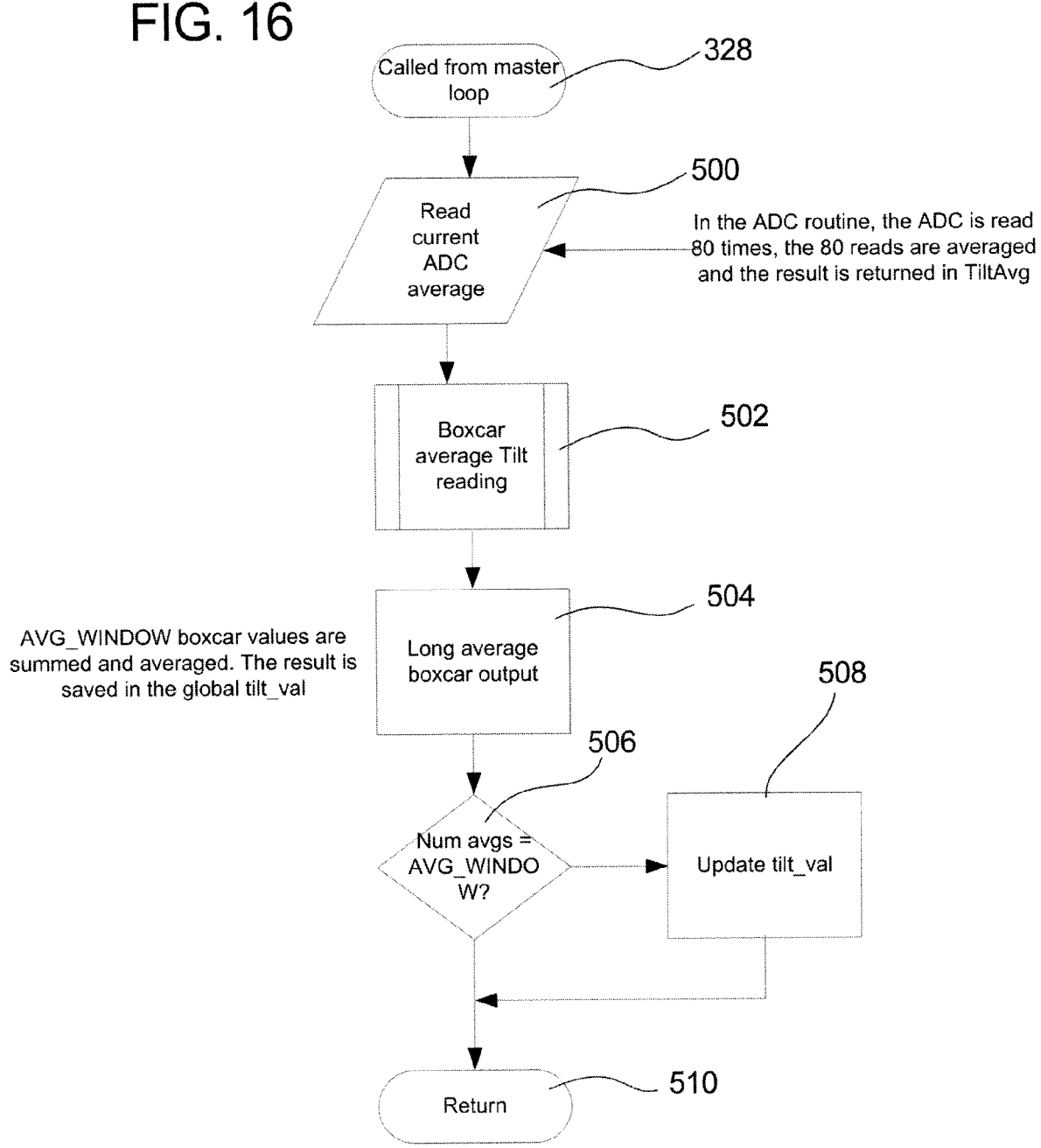
FIG. 16 shows a flowchart for determining the calculated amount of tilt of the water vessel.

The first step in FIG. 16 indicated at 500 reads the voltage average from the tilt sensor 230 (see FIG. 5). In one form, a sum of readings such as eighty readings of the sensor are accumulated in quick succession at the rate of the on-board ADC sample acquisition time. The accumulated sample is then averaged (divided by eighty if eighty readings were recorded). The result of this average is then fed into a seven element boxcar average smoothing routine (step 502). The output of the boxcar average smoothing routine is accumulated for 1000 iterations, and then divided by 1000 (double averaged) (Step 504). This double averaged result is then stored in RAM in a variable tilt_val (step 508, FIG. 16). As shown in the software appendix this RAM value is updated approximately every 4 to 6 seconds. In one form at approximately every 32 seconds, the value stored in RAM is compared to the programmed value for the center position (step 506). Deviation in excess of a predetermined value of four counts to either side of the center position will cause the microcontroller 210, FIG. 5, to move the appropriate trim tab a set number of position increments (e.g. two) to attempt to correct the list (step 508).

The variances of movement from each tab can occur from various fluid resistance from one line to the other. One way of accounting for this discrepancy is to operate each tab independently by the code such as the left one increments and the right one increments or vice versa in succession. Of course, the tilt sensor will accommodate for any such variances without using such differentiating methods for treating each tab individually. Whereas if one trim tab gets off-centered and the boat begins to list, the tilt sensor will correct this list by the method described above. Whereas the microprocessor is adapted to control the port or starboard trim tabs independently if the tilt sensor indicates a list occurring about the longitudinal axis.

Thereafter, indicated at 510, the code returns back to the main function which is generally indicated at FIG. 7 and it continues to follow with step 330 now described in detail below.

After inputting data and making potential adjustments from the tilt sensor in step 328 of FIG. 7, the decision step at 330 determines whether a speed has been read from a speed indicator such as a GPS unit.

Figure 11:
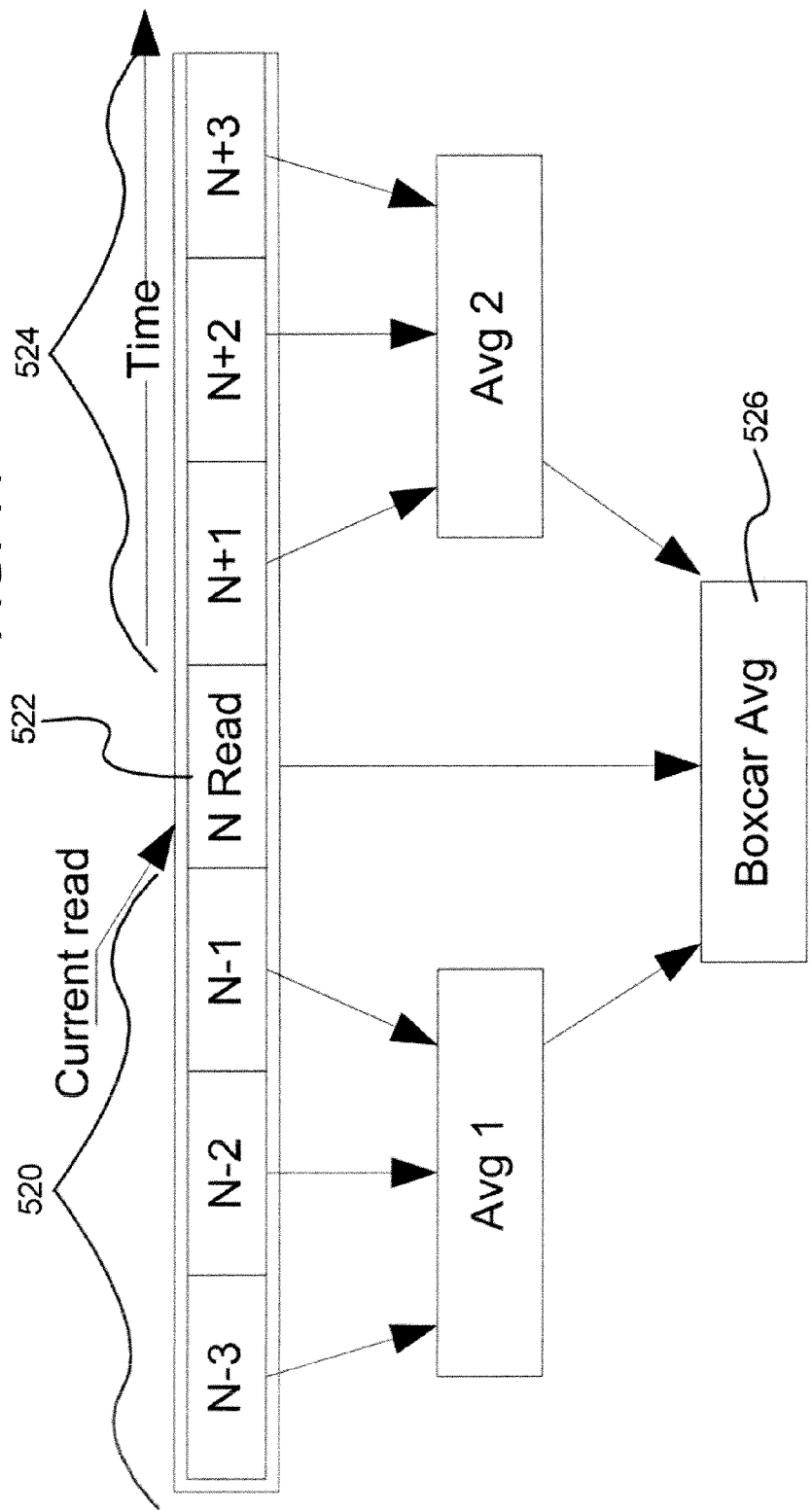
FIG. 11 shows one method of averaging input velocity readings known as a boxcar averaging algorithm.
Figure 12:
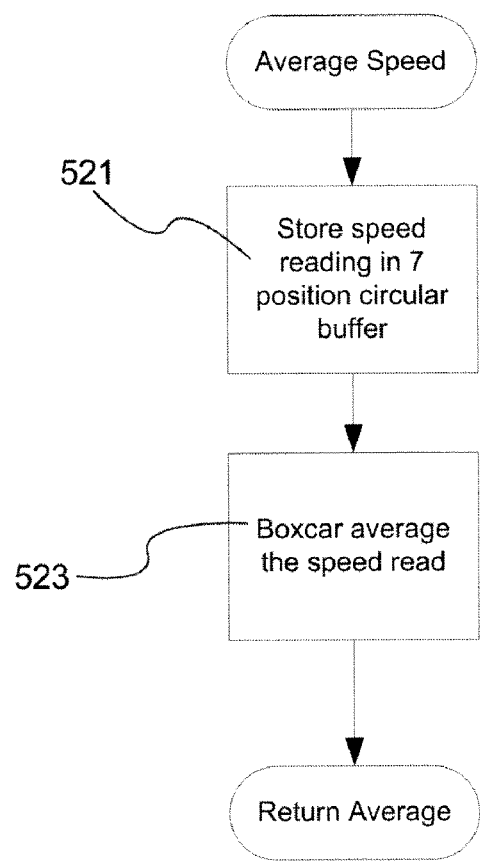
FIG. 12 shows a method of engaging in the averaging of the speed readings of the water vessel.

When a GPS speed reading is received, (or other speed sensing device such as a paddlewheel), the boxcar averaging function indicated at 332 in FIG. 7 is executed. Typically, speed readings, from any source can vary more than the actual vessel speed varies. This can be caused by currents, chop, antenna movement, and a variety of other sources of speed reading errors. In order to ensure the speed read actually reflects the vessels movement, a smoothing algorithm is used to dampen speed variations. A boxcar averaging algorithm is employed for this purpose. As shown in FIG. 11, in the boxcar average, the average of the previous readings 520, the current reading 522, and the average of the next three readings 524 are in turn averaged together to produce the value indicated at 526. As shown in FIG. 12 the step 521 indicates the reading of the adjacent speed readings in the buffer and step 523 shows the process of averaging the speed where the returned value exits the function.

Now advancing to decision 334 of FIG. 7, the logic in the main function determines whether the log output buffer is free. The trim tab system transmits a log record every time a speed value is read. In one form, using standard NMEA0183 data, a log reading occurs approximately every two seconds. In one preferred form, the log record is in the following format:

| Header $ | Hi byte Speed (text) | Lo byte Speed (text) | 0 | Lo Byte Cur Speed | Tab Range |
|---|---|---|---|---|---|
| Port Tab Curr Pos | Stbd Tab Curr Pos | Hi Byte Tilt Val (Bin) | Lo Byte Tilt Val (Bin) | Trailer # | |

Byte 0: Header = "$"
Byte 1: Hi byte of new speed reading, 8 bits, ASCII
Byte 2: Lo Byte of new speed reading, 8 bits, ASCII
Byte 3: Hi Byte of current speed, 8 bits, ASCII
Byte 4: Lo byte of current speed, 8 bits, ASCII
Byte 5: Tab limit value, 8 bits, binary
Byte 6: Port Tab current position, 8 bits, binary
Byte 7: Starboard Tab current position, 8 bits, binary
Byte 8: Hi byte of Tilt val position, 8 bits, binary
Byte 9: low byte of tilt val position, 8 bits, binary
Byte 10: Trailer, 8 bits, ASCII = '#'

Log Record Format

The log record buffer is populated in the main loop whenever a speed has been read from the input speed source, and the previous log record buffer has completed transmitting. Actual transmission of the log record is accomplished in the UART ISR as discussed in reference to FIG. 17.

Figure 17:
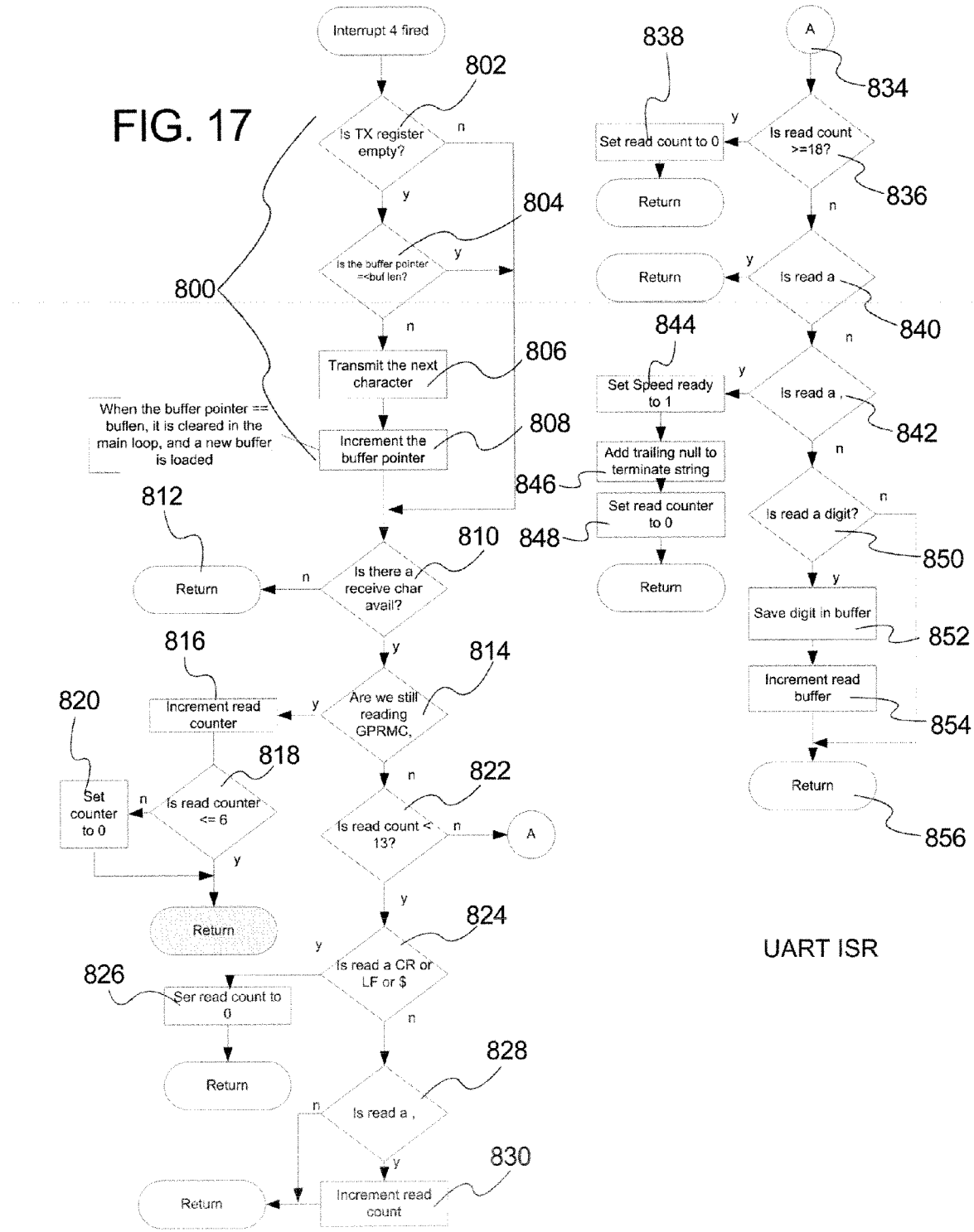
FIG. 17 shows a flow chart relating to a data transfer scheme, specifically a serial data input/output routine.

Now referring to FIG. 17, which is a UART ISR. This logic represents is for transmitting log data and receiving GPS data. The section indicated at 800 is a transmit section which determines if the interrupt was generated by a transmit register as indicated at 802. The transmit buffer pointer determines if it is at the end of the buffer as indicated by step 804. If it is not, then the next character out of the buffer indicated at 806 is put in the transmit register and thereafter, as indicated in 808, the buffer pointer is incremented. When the buffer pointer equals the buffer length, the main routine can determine if the buffer has been transmitted and is freely available for modification to prepare for the next buffer transmission.

Thereafter, in step 810 the receive register is checked, and if no characters are received, the loop exits as indicated in 812, otherwise, the step indicated at 814 looks for the character string that signifies a GPS speed reading, which in one form is an "GPRMC," character string. If that string is received, then we advance to 816 which increments a read counter where essentially step 818 continues until the string "GPRMC," is read. When the complete string is read, the counter is set to zero as indicated by 820. Essentially, the string read up to the steps in FIG. 17 occurs for each character which is read, so when each of the individual characters "GPRMC," or any other equivalent header to signify a GPS data value, thereafter, once this is read, we advance to the decision indicated at 822 which checks the character count where the first past is the character count is at 0 and this step ensures the character count is less than 13. Essentially, the code is counting commas in the string as indicated at 828 described below. The decision box at 824 detects whether a carriage return or line feed indicates a bad sentence, and if so the data is discarded. In this scenario the counter is set to 0 as indicated at 826 and the loop is exited. The decision 828 determines if the data read is a comma; if it is, it increments the counter indicated at 830. This counter is referenced at the counter that is read at step 822. Now referring back to 822, if the count is greater than 13 indicating 13 commas have been read in the data stream, the flow proceeds to step 834 where if the count is 18 or greater indicated at 836, then a malformed sentence has been detected as indicated at steps 838 and the data is discarded, and the routine returns. Otherwise, the step indicated at 840 determines whether a decimal point is read, and if so, the routine returns. Otherwise if the read is a comma at this point as indicated at 842, then we have determined at this point we have read the speed at 844, and we indicate this is a valid speed read in the buffer, and then we add a terminating null indicated in step 846 to make it a string and reset the read counter as indicated by step 848 to allow us to read the next string. Otherwise, now referring back to decision 850, there is a determination if a digit is read where it is determined if a numeric digit is read, if so, this digit is saved as indicated in 852 and we increment the read buffer as indicated by 854 and then we exit as indicated by 856.

In essence, the subroutine in FIG. 17 occurs based on firing off an interrupt where a character from the GPS sensor is read and all of the various steps above try to pull out the desired values which indicate the speed reading and parses a GPS speed string, extracting the speed data. Further, it should be noted that the steps indicated at 800 handle the transmit portion. It should be noted that in FIG. 7, step 334 where it determines whether the log output buffer is free, this correlates to the buffer pointer 808 on FIG. 17 equaling the length of the buffer.

If the log buffer is not free, then the decision 334 is executed, which means that the route beginning at arrow 336 is employed without this speed value being recorded in any form. The internal workings of the subroutine to adjust the trim tabs with the speed still essentially continue, but because the buffer is not available, the log record is not updated to reflect the speed change. If the log is free, then there is an update to an array, log buffer (LOGBUF) and the log state variable is set to indicate the buffer is ready for transmission, as indicated at 340, FIG. 7

Now referring back to FIG. 7, step 342 evaluates the speed change in accordance with the manner described above. In general, rough or choppy sea conditions may result in rapid, small changes of speed readings. These small deviations can occur with every speed reading, generally vary by a few tenths of a knot in either direction, and do not indicate the true speed of the vessel. The trim tab controller 20 compensates for these speed variations by determining the length of time since the last detected change, and ignors small changes that happen frequently. In one form, the algorithm operates in a manner where if there has been 2 seconds since the last speed change, a 1 knot change is required in order to be accepted. If it has been 4 seconds since the last speed change, a minimum of a 0.6 knot change is acceptable (see FIG. 9).

With regard to speed, the velocity sensor, a GPS system gives an actual positional data indication (although not necessarily highly accurate) whereas another speed sensor such as a paddlewheel only gives a relative movement between the water, which could have currents, eddies, and other things affecting its relative position. It should be noted that at the time of filing, GPS's tolerance accuracy is approximately plus or minus 15 meters from an actual position. Therefore, adaptive speed reading and a certain time delay under empirically determined values has proper controlling properties as described herein for making the system not unnecessarily volatile and truly finding an optimum speed reading over a course of a few minutes. It is imperative to use an averaging-type system, given we know the inaccuracy of the data in order to condition the speed data to produce a useable, valuable data point for reference purposes.

There are several areas of data noise, and the goal is to pull out proper data values from this inherently noisy data reading of the velocity. Actionable data is a final data value which determines whether the trim tab control system can make a proper determination to alter the trim tabs. The areas of inaccuracy include inherent inaccuracy of the GPS system, plus or minus 15 meters in position as previously discussed, sea state conditions whereas there may be an actual velocity change in the water vessel but the causal factor for such velocity change is not the trim tab position, but other factors such as surfing, driving into a swell, and finally, other factors such as antennae movement swaying to and fro about a lateral axis, or any movement can cause inaccuracy in the actual reading of the GPS signal. It should be noted that Differential Global Positioning System (DGPS) can be incorporated as well, in addition to any other similar alternative which may be developed in the future.

Figure 9:
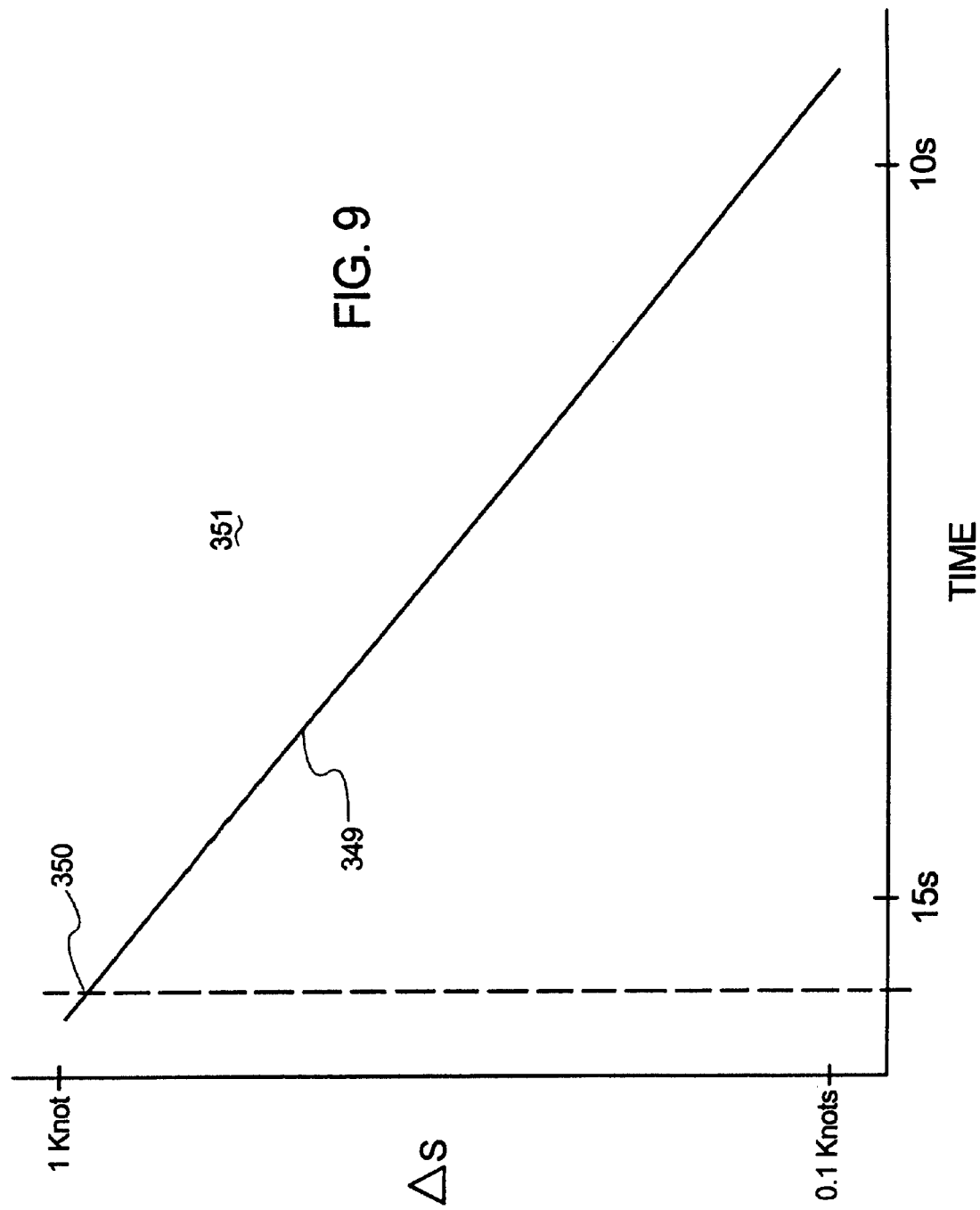
FIG. 9 is a schematic graph illustrating a general relationship of change in boat velocities with respect to time increments to illustrate a sliding scale of acceptable change in speed of a water vessel to warrant an alteration of the trim tabs.
Figure 15:
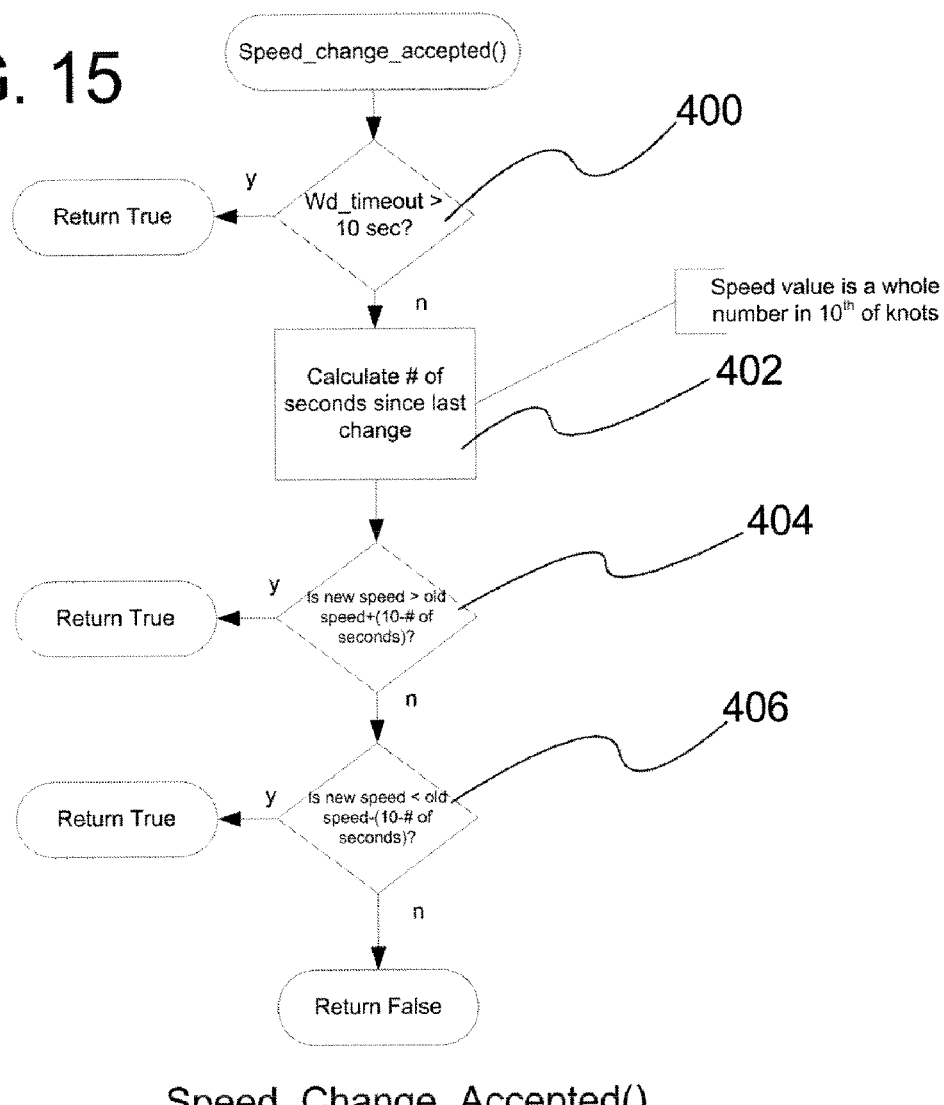
FIG. 15 illustrates a routine that determines if a speed change is acceptable in order to initiate a potential trim tab adjustment.

Specifically, FIG. 15 shows the subroutine to invoke the above-mentioned logic. The watchdog timer first determines if it has been 10 seconds or more since the last speed change (400). If it has been 10 or more seconds, any amount of speed change is acceptable. Typically, the smallest value reported will be 0.1, or 1/10 of 1 knot. Otherwise, step 402 will calculate the number of steps from the last speed change to essentially determine a ΔT to roughly gauge a position along the X-axis of the graph as shown in FIG. 9. Steps 404 and 406 essentially invoke the logic which is inherent in FIG. 9 whereby any data location generally indicated the area 351 above the line 349 will return true to invoke an acceptable speed change.

Another benefit of the adaptive algorithm as illustrated by the graph in FIG. 9 is that if there is very smooth water and there is potential to refine the position of the trim tabs, such minor speed changes (ΔS's) are utilized because they are recorded and compared following boxcar averaging, after longer time increments (e.g. 10 seconds) to create actionable data items to further alter the trim tabs and finally refine the position thereof. There may be more coarse velocity readings in rougher conditions. Essentially, if the speed change is greater than the inertia of the boat will physically allow, this is probably due to external factors other than the actual speed of the boat or causal factors being caused by the trim tabs. Therefore, the coding allows to ignore these readings or the ΔS's they represent or the spurious speed change readings.

It should be noted that if the sea conditions are such that it is conducive for volatile speed readings, say for example from 20-20.2 knots at short time intervals, then these small ΔS's may not be sufficient given a short time increment to take action on. However, given the adaptive speed algorithm, as illustrated in FIG. 9, after a certain period of time (e.g. 10 seconds), there may be action taken upon them; however, even if such action may not be correct or may not be based on proper data, at least such destructive or incorrect tab action is delayed every ten seconds as opposed to being incremented more frequently. So essentially, the main function of the adaptive speed reading is to allow for the fine-tuning of the trim tabs on good conditions; however, there is a further benefit where in choppy water, speed reading which may not be absolutely correct are at least deferred over a larger time interval avoid incorrect alteration of the tabs. It should be noted there are several methods to provide an adaptive speed reading after an acceptable speed change an actionable data value is recorded. In one form the time interval can be reset for a proper time to take another value. Alternatively, a continuous 10-second countdown timer can be provided resetting itself every 10 seconds.

If the speed change is accepted, step 346 is invoked in FIG. 7 where the tab adjustment occurs. More specifically, in step 346 the trim tab management portion of the code essentially manages the operation of the trim tabs. In general, the basic adjustment criteria of the trim tabs is determining if an acceptable speed reading is put forth for valuation and if the speed increases, the trim tabs are adjusted in the same direction as the last adjustment. If the speed decreases from the last measured reading, then the trim tabs are adjusted in the opposite direction. Of course implementing this logic is somewhat complex and must be executed in a manner to sufficiently adjust the trim tabs, record the general position of the trim tabs within the microcontroller 210 and determine when it is proper to adjust the trim tabs based on the phase (current speed) of the water vessel.

In general, the trim tab movement is conducted in a manner such that there is a memory value for an actual trim tab position and a memory value for a requested trim tab position. When these values are not equal, the code will alter the position of the trim tabs in the desired direction until these values are equal in a manner through various loops described herein.

Figure 10:
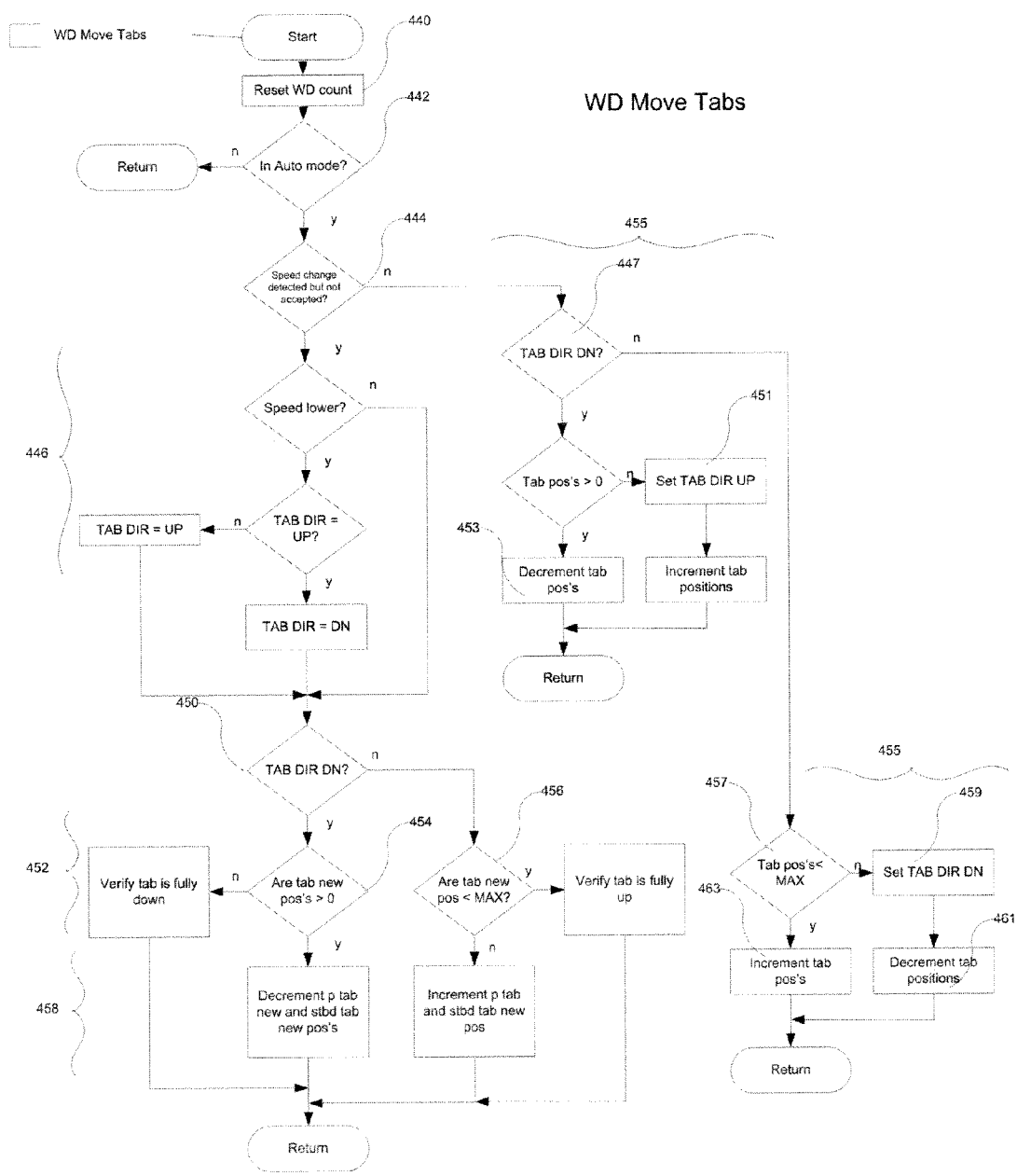
FIG. 10 discloses a flowchart for a function that is adapted to reset pointers in order to move the trim tabs.

The routine that will request tab movement is the wd_move_tabs( ) function as illustrated in FIG. 10. The above routines are invoked at different phases of the trim tab controller as determined by vessel speed. Essentially, there is no need for tab adjustment when the water vessel is traveling at a very low speed such as phase 1 as shown in FIG. 8. Further, at intermediate speeds, it is desirable to have the tabs all the way down to help the water vessel get "on plane" where no tab adjustment is necessary (see phase 3 the planning phase in FIG. 8). There will now be a detailed discussion of the move tabs function with reference to FIG. 10.

This wd_move_tabs( ) function is called whenever a change in speed has been detected and accepted, and when the system is in automatic mode where the system is in phase 4, the automatic mode phase (see FIG. 8), or whenever the watch dog timer expires. This function determines if the tabs need to be moved up or down an increment, and adjusts the new position request pointers accordingly. The general algorithm is:

If the tabs were moving up, and the speed increased, move the tabs up 1 tab position;

If the tabs were moving up, and the speed decreased, move the tabs down 1 tab position;

If the tabs were moving down, and the speed increased, move the tabs down 1 tab position;

If the tabs were moving down, and the speed decreased, move the tabs up 1 tab position.

The tab position increments are determined the length of time the tabs are activated. This is an adjustable parameter, but present analysis indicates that approximate ¼ second increments for the tab position is desirable. The wd_move_tabs( ) essentially bases tab movement upon acceptable speed changes. The granularity or size of acceptable speed change is determined by the length of time between speed readings. As described above referring to FIG. 9, if a speed change is detected every 2 seconds (the most granular possible with 2 second GPS readings), then a larger change of speed (1 knot) is required in order to be accepted. If the speed has not changed in the last 5 readings (10 seconds), then a speed change of 0.1 knots will be accepted. If the last change occurred 6 seconds ago, a minimum speed change of 0.4 knots is needed for acceptance. It should be noted that each accepted speed change will reset the watchdog counter.

Referring now to FIG. 9 in greater detail, there is basically a sliding scale indicating the change in speed with regard to time where if there is a significant speed change indicated by ΔS as indicated at 350, then a smaller time increment is allowed to accommodate this large speed change. In other words, if a large speed change happens in a short time increment, this is considered a worthy data point to make an alternation. If there are rapid small fluctuations of speed of say, under one knot, this would not be good data to base a speed change. If ΔS of a knot for example fluctuates between 20 and 20.5 knots, with speed readings occurring every 2 seconds, this would indicate essentially a noisy incoming speed curve upon which any one localized gradient point is not used to assess any change in tab position. The data values to determine valid ΔS values are configurable parameters, and the ΔS value which is acceptable to pass through the good data value to base the decision on within the speed optimization routine described herein. The speed fluctuation changes are, perhaps, actual speed fluctuations but the causal factor may not be due to the tab positioning, but other external factors, such as movement of the antennae or hitting swells.

Figure 18:
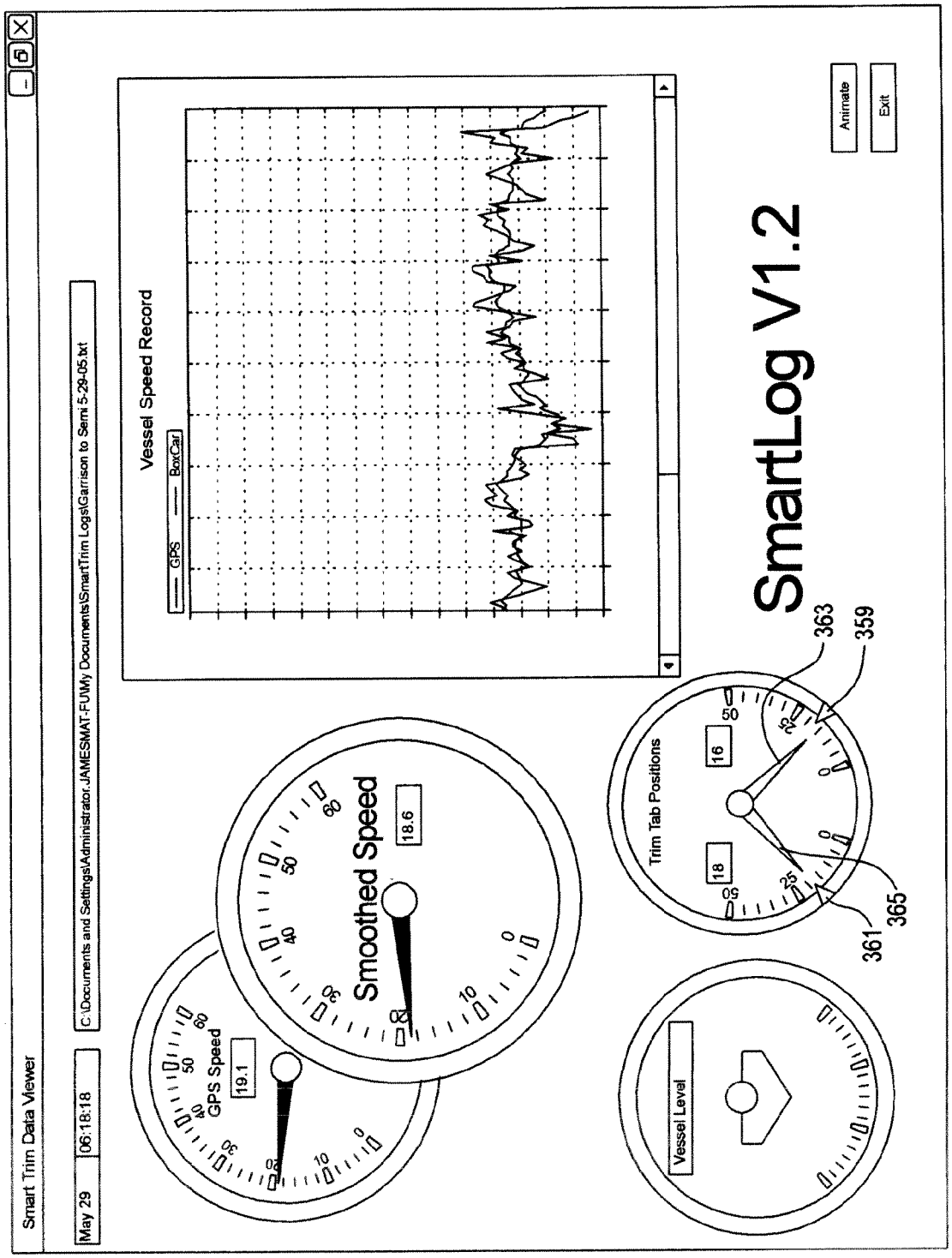
FIG. 18 shows a schematic view of a software program adapted to track the velocity, trim tab position, and list of a water vessel.
Figure 19:
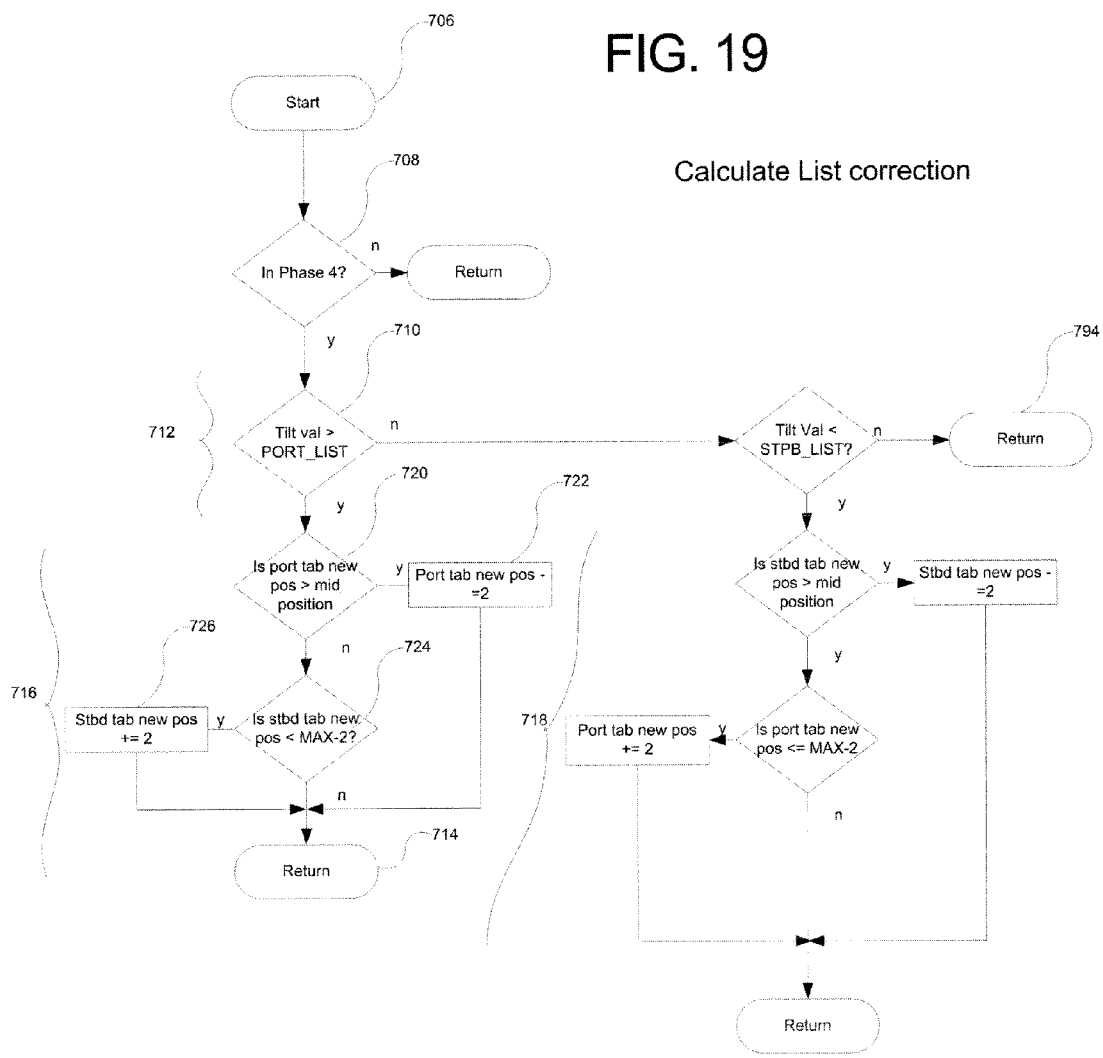
FIG. 19 shows one form of logic of correction a water vessel list with trim tabs.

As shown in FIG. 19, the line 355 indicates the actual speed readings given from the speed sensor and the line 357 indicates a smoothed speed comprised of a plurality of actionable data points. If the noisy data point were used to perform the conditional logic, it would appear that the speed is changed, whereas it is really just a noisy signal and does not really represent the true velocity of the water vessel. Whereas the line tends to average the speed readings and as indicated in FIG. 18 at an overall increase in speed given time which can be attributed to the trim tab control system. FIG. 9A shows an example of a noisy signal curve of the change in speed readings (ΔS) as an example of the raw data such as the raw data readings indicated at 355 in FIG. 18. As indicated in FIG. 9A the noisy data indicates various gradients which are not proper to use for logic for determining tab movement.

Referring now to FIG. 10, there is a schematic flow diagram of the wd_move_tabs subroutine where in the first step 440, the watchdog counter is reset. Essentially, resetting the watchdog timer indicates that the tabs are to be repositioned and the watchdog will not have to be invoked for another extended period of time.

The decision indicated at 442 essentially exercises conditional logic to determine if the system is in automatic mode, which means the system is in phase 4 (automatic mode phase) as shown in FIG. 8. If the system is in automatic mode, the logic passes to step 444 which determines if the routine was called as a result of an accepted speed change, or due to the watch dog timer timeout.

If the routine was called as a result of an accepted speed change, the logic group 446 determines that the speed is lower and if so switches the direction of the tabs from up to down or down to up in step 450, the logic determines whether the direction is down or up and the logic set indicated at 452 essentially determines whether the tabs are already at their maximum positions where if the direction of the trim tabs is down the position memory indicator must be greater than zero as indicated by decision 454. Alternately, if the tab direction is up then the tab new position must be less than the maximum program value indicated at decision 456. The logic group indicated at 458 will advance the new position tab pointer tab up or down depending on the direction.

If the routine was called as a result of a watchdog timeout the logic at 445 will determine whether to move the new position tab pointers up or down as indicated at 326, FIG. 7.

The routine in FIG. 10 is only called whether a speed change is detected or the watchdog timer timed out. Now referring back to decision 444, if the step is called by way of a watchdog timer, then the steps indicated at 445 are invoked. The first step determines the tab direction as indicated at 447 and further determines if the tabs are all the way down. If the last time that the watchdog fired the tab direction was down as indicated at 449, then it sets the watchdog to tab position to up as indicated in step 451. Thereafter, the routine will adjust the pointers as indicated in step there following. If tab direction is at the max tab position and equals the assigned value 0, the step indicated at 453 is invoked, which indicates that the tab direction is up and essentially will invert the direction.

If the last tab direction was not down (i.e. up), then the steps indicated at 455 are invoked. If the tabs are at the maximum position as indicated by the step 457 and inverted down as indicated by the tab position to be down as indicated by 459 and decrement the tab pointers as indicated at 461.

Otherwise, if the tab is just not at the maximum, then the position request pointer is incremented as indicated at 463 and the routine is exited.

The trim tab movement itself (i.e. electrically turning on the pump and controlling the valve solenoids) is controlled exclusively, with 3 exceptions, within the Timer 2 ISR routine which is shown in FIGS. 13 and 14. When a routine outside of the Timer 2 ISR routine is programmed to move a tab, it does so by modifying a new position request pointer. This pointer is compared to the current tab position pointer in the Timer 2 ISR, and the tab is moved in a direction necessary to make the current tab position pointer equal to the new position request pointer. It should be noted that there is a current position pointer and a new position request pointer (CURPOS and TABPOS discussed herein) for the starboard tab as well as similar pointers for the port tab. This allows for individual adjustment of each tab.

The 3 exceptions to the ISR's exclusive control of tab movement are as follows:
  On power up, the initialization functions ensure that the pump motor and tab solenoids are off;
  The routine shown in the software appendix move_tabs_full_down( ) forces the tabs fully down, disables the ISR, and enters a non-preempt able cycle to ensure the tabs get fully extended;
  The routine move_tabs_full_up( ) forces the tabs fully up, disables the ISR, and enters a non-preempt able cycle to ensure the tabs get fully retracted.

After the new position trim tab request pointer is set, the actual movement of the tabs (given the three listed exceptions described above) is controlled exclusively by the Timer 2 ISR routine. The Timer 2 ISR routine further determines if the tabs are being moved by the manual switches, and tracks the direction and duration of movement when the switches are being used. If the user is interfacing with the toggle switches 56 as shown in FIG. 4, this movement is measured by the switch sensor circuit 236 as shown in FIG. 5 and the array of ports 242 which interface with the microcontroller 210 indicate that the tabs are presently being moved. The logic within the microcontroller can essentially determine that the microcontroller is not changing the movements by way of the relay control circuit 212 of FIG. 5, then the default option is that the boater is adjusting the trim tabs manually.

The Timer 2 ISR routine further checks the new position request pointers against the current position pointers, and determines if a tab movement is necessary. The Timer 2 ISR routine moves the tabs by engaging the appropriate relays (Pump Pressure or Retract, and one or both of the solenoid valves or directly inputting data to the control box 31 as shown in FIG. 4) and moving the tab current position 1 count closer to the new position request pointer. The Timer 2 ISR routine as shown in FIG. 13 further checks the position of the tabs to make sure the tabs are not fully up before attempting additional retraction, or are not fully down before attempting additional extension. This routine also resets the watchdog count described herein.

Essentially, there are two variables relating to tab movement in one form of drafting the subroutines. The variables represent the desired position of the trim tabs and the current position of the trim tabs (port_tab_new_pos, Stbd_tab_new_pos (TABPOS), and port_tab_curr_pos, stbd_tab_curr_pos (CURPOS)). In general, if the pointers are not equal, it determines which relays should be, or should continue to be engaged, and outputs the appropriate value to the relay control port. If the TABPOS and CURPOS pointers are equal, the Timer 2 ISR disengages the relays. In one form, the Timer 2 ISR performs this check every ¼ second. When the requested position of the tabs is altered, the variable TABPOS is modified. When the speed routine indicates that the tab position should be lowered it decrements this value. If the variable TABPOS and CURPOS are not equal, then the routine activates the relay control circuit 212 (FIG. 5) to open the appropriate valves and pressurize in the correct fashion to turn it on and activate the tabs.

The code then advances to the routine portion indicated at 622, which essentially turns off the valves and turns the relay off. If the manual override occurs as indicated at 680 (FIG. 14), this override is detected through the bank of data inputs shown as 242 in FIG. 5 which indicates that tabs are being manually repositioned. Because there are no sensors on the tabs, this repositioning will have to be recorded within the memory locations in the processing unit, and essentially the tab position is decremented or incremented in the direction those tabs are traveling. It should be noted that the routine shown at 626 (FIG. 14) is actually fired at a set increment of interrupts, say 25. This equates to a ¼ second pulse (given the clock rate of the microcontroller 210 discussed above) of the appropriate relay(s) for every difference in count between the new requested position and the current position.

There will now be a detailed discussion of the Timer 2 ISR with reference to FIGS. 13 and 14. FIGS. 13 and 14 are part of the same logic flow diagram scheme separated by an off page connectors 654 and 624 on FIG. 13 connecting to 656 and 626 on FIG. 14 respectivly. This routine is a timer interrupt which activates at a certain increment and fires when a timer overflows. Step 600 disables the interrupt to stop the timer, and advancing thereafter, step 602 checks whether the watchdog counter is available and free to modify. In general, there is a locked variable in one form of carrying out this step just to ensure that the data is not corrupted or read where essentially it determines that there is not a routine outside of the ISR currently in the process of modifying the watchdog timer variable. Then the logic advances to where if the watchdog data is locked it does not increment the counter as indicated in step 604 and of course if it is not locked, it does increment such counter.

Step 604 further indicates another counter that acts as a prescalar of the ISR timer, being triggered by a preset number of ISR timer triggers, 100 of such triggers in one embodiment. This prescalar provides a timing function that is a function of multiple ISR timers, thereby generating a longer timer interval than is possible with the Timer 2 ISR. By way of background there is a counter as a part of the microcontroller, and the microprocessor increments the number in the counter at a rate that is a function of the processor clock. When the timer overflows, it generates the interrupt and the timer is reloaded.

The decision indicated at 606 determines whether the count that is pulled at 604*a* equals a pulse duration value which in one form can be a number in a scalar value which is essentially the number of interrupts which can occur in a quarter second, which is approximately 600 in one form. At 608, the timer data values mentioned above are reset and incremented again thereafter. Step 610 indicates another counter related to the tilt sensor. Step 610 essentially increments a tilt counter where that acts as an additional prescalar of the Timer 2 ISR to generate a time interval of 30-40 seconds. When this 30-40 second timeout period expires, the value stored at 508 (FIG. 16) is compared to a value stored representing a level vessel. This process is shown in step 612 where if the tilt count value varies from the preset vessel level value, an adjustment is made to the tab position pointers causing appropriate tab movement to correct the list.

In step 616 a pin is toggled on the microprocessor which allows measurement of the quarter-second period for diagnostic purposes, which is used in one form of the invention such as tying in the oscilloscope for various reasons. It should be noted that step 616 is a completely optional and useful when testing and diagnosis is necessary for determining optimum variables and in a preferred production form, step 616 would not be available.

Essentially step 618 determines whether it is okay to move the tabs without interfering with other portions of the program, which may, for example, be moving the tabs all the way down such as in the planning phase (Phase 3) where the water vessel is arriving at a planning speed. If the tabs are cleared to move, the code advances to step 620 where the tabs are compared from the current position to the requested position in accordance with the manner described generally above. If current tab position variable, CURPOS, equals requested tab postion variable, TABPOS, for both tabs, then essentially, the tabs are positioned where the microprocessor will have them repositioned and the tabs are at the required position step 622 which essentially takes you to the off-page connector 624 which advances us to the manual switch routine which is positioned below the off-page connector 626 in FIG. 14.

The step below 626 is described further herein where reference is now made back to FIG. 13 beginning at box 628 which follows box 620 where, essentially, the decision at 620 indicates that tabs must be repositioned. Step 628 essentially sets a global flag indicating that tab movement is being controlled by the microcontroller, and any signals detected by the manual switch sensors should be ignored. Essentially, step 630 can take the CURPOS variable or TABPOS variable and in various methods such as subtracting or comparing them, simply determine whether to move the tabs downward or upward. It should be noted in some situations one tab may be denoted to go down and the other may go up. In such systems such as the Bennet® system as described above with reference to FIGS. 2-3, because the motor cannot go in both directions simultaneously in the hydraulic circuit, the down tab will take precedence and move downwardly and the opposing tab that's flagged to go upwards will not move. However, in the next go-around of the loop of this routine, the tab moving down will have reached its position. Therefore, the only difference requested movement will be for the other tab, hence that tab will move up in the next iteration. This logic is encompassed in step 632. Step 634 indicates that neither of the tabs needed to go down, so either one or both of them must go up and step 636 conversely determines that neither of the tabs need to go up, so one or both of the tabs will go downwardly. Essentially, the steps indicated at 638 above determine which direction the tabs are to travel in.

Now looking at step 640, if the direction is set to down, then we advance to the general flowchart steps indicated at 642 which determines which tab (or if both tabs) needs to be repositioned. The decision at 644 determines whether the port tab is equal or needs to be positioned downwardly. If the port tab does need to be moved down, then we advance to step 646 which prepares the engagement of the port valve 42 as shown in FIG. 1. Thereafter, the value as recorded within the microcontroller is decremented as indicated in step 648 and thereafter, similar logic is applied to the starboard tab as indicated by the steps indicated at 650 where like terms are noted at step 640 and the plurality of steps at 642. It should be noted that if movement on the port tab is not required, then the step indicated at 652 is undertaken where the similar comparison is passed on to the steps showing at 650. It should be further noted that step 652 ensures that the valve (in this case the port valve 42) is turned off. After the value 648 is decremented, the next time the tab position loop cycles through to the same step (assuming it makes it to this step), then at this point the valve will be turned off, or alternatively, if it must decrement another additional tab position, then it will remain on, however the internal value will decrement, presumably getting closer to the desired value. Each passage through this loop mentioned above equates to a tab movement increment and is approximately 0.25 seconds in one form. Most of the changes throughout the all the code segments and routines will decrement the request pointer by one positional unit; however, in one form, for example with the tilt sensor as described herein, this may decrement it by a value of, say, 2 position increments to have a greater rotational effect about the longitudinal axis 12 of the boat 22. Thus the relays will be turned on for two time increments which in one form is approximately 0.5 seconds.

It should be noted that in general the incrementing value system which essentially uses a counter and the system clock to represent a real time increment gives some flexibility because the time duration of the pump and valves being operated is a function of the interrupt time value multiplied by the number of interrupts between executing this routine. By having a predetermined interrupt value divided with the large number of interrupts, the code provides additional flexibility to increment the amount of time the valves are turned on.

Continuing to FIG. 13, we now advance to the off-page connector 654 and progress to the connector 656 in FIG. 14. So far, the down direction has been processed, now the presumed step at 656 after following the decision 640 in FIG. 13 is that the direction is up. It should be noted that because the logic indicated at 642 and 650 can essentially turn the motor on in a direction, it is necessary to skip steps 658 and 660, which have similar logic to that as described in 642. This is to ensure that the motor will not be activated in the reverse direction to lift them up if the situation is, for example, where one tab is to go down and the other is to be repositioned upwardly. Therefore, the off-page connector 662 is followed that advances the logic the way to the off-page connector 664 in FIG. 14.

Steps 658 and 660 operate in a similar manner as 642 where all of the details described therein are relevant to the steps as well. Now the decision indicated at step 666 determines whether one or both valves are turned on. If they are not, there is an invalid configuration as indicated at 668 because there must be at least one valve on. Therefore, 668 resets all relays to off, which essentially turns the valves and pump off, or rather, this step sets a variable to turn it off which is used by way of conditional logic below to carry that out. The various logic groups 642, 650, 658 and 660 each set a bit to indicate that the valve is open. If for some reason none of these valves are open, out of an abundance of caution, step 666 sets a variable to turn off the pump so pressure is not applied to a closer-circuit which is a closed hydraulic circuit.

Step 670 turns on the appropriate pins which correspond to the valve and pump direction which is desired to be turned on. This correlates to pins 218, 218a, 218b, and 218c as shown in FIG. 5, and the step indicated at 672 turns off the other pins on the port which are set to 0. Whatever bits are not turned on, the remainder of them are turned off. This process is to ensure that the other bits are not floating at some unknown value when they are expressly turned off by way of the code. Thereafter, the timer interrupt indicated at step 674 is enabled, and the routine is exited as indicated at step 676. Now referring back to the page jump 626 on FIG. 14 which followed step 622 in FIG. 13, which indicates that manual switches are being invoked. The code is adapted to read whether the manual override is engaged by way of the panel 56 as shown in FIG. 1 by the helmsman. Essentially, this movement of the tabs invoked by the helmsman or other external source needs to be recorded.

Referring now back to step 620 at FIG. 13, two steps are taken where essentially if no auto-adjustment is necessary or indicated at the path below 620, then the code advances to the right-hand portion of FIG. 14 at off page connector 626. If there is a manual override, then this manual movement is recorded by way of the pin array indicated at 242 by the switch sensor circuit 236 as shown in FIG. 5.

Now referring to FIG. 14 below page jump 626, the decision 680 determines whether the pump 58 is activated. If the pump is not activated, this loop terminates as indicated at step 682. Decision 684 determines whether the retract line 242' in FIG. 5 which is fed to the microcontroller 210 is active. If the retract line 242' is active, then we advance down to the logic section indicated generally at 686. In general, this step determines which of the two ports is active, if not both, and will increment the current position value within the microcontroller and the requested position so no change is made by the microcontroller by way of the logic above, to more accurately reflect the actual position of the trim tabs by way of the manual override. More specifically referring to 686, the steps 688 and 690 each determine whether the port or starboard valves are active individually. If either tabs are in motion, then the appropriate pointers are incremented as indicated by steps 692 and 694 respectively. Alternatively, both pointers are incremented in a case where both valves are activated by the helmsman as indicated by step 696. A similar logic set 686 will be executed at step 684 where all of the tab direction pointers indicating retraction will be reversed to indicate pressure (downward tab movement) to properly increment or decrement the tab position pointers.

Now advancing to step 698, this step essentially sets the upper value of the possible range of the trim tab adjustment so where as described in general above, this upper range limits the automatic movement of the tabs to not bring the tabs above this position. The decision 700 essentially determines if the tabs are all the way down at a zero tab position, if the tab is all the way down to the zero value or all the way against the stop, then the tab position limit is set at, say, a value of 5 or something above that as a minor rebellion against the helmsman to allow some control over the trim tabs at this level by way of the microprocessor for some automatic movement. This process occurs in step 702. Otherwise, the return indicated at 704 is executed and the routine exits.

Now referring FIG. 19, there will be a detailed description of the calculated list routine which is called by decision 614 in FIG. 13. The routine begins at 706 and advances to the decision at 708 which essentially determines whether we are in an automation mode phase as indicated by step 370 in FIG. 8, which is indicated at phase 4. If we are in automation mode, then we advance to step 710 which is merely a comparison to determine if the tilt value read from the sensor has exceeded a list value of port list. The group logic indicated at 712 determines whether the calculated digital value taken from the list tilt sensor is beyond a median range to do any individual action between the port and starboard tabs. Otherwise, if it is in between the acceptable range, it returns and exits the loop as indicated in 714. This acceptable range value could be a programmable value to reflect an acceptable range which is considered substantially level about the longitudinal axis 12 for the water vessel 22. If the tilt value is greater than the port list value as indicated in 710, then a port list has incurred.

Therefore, the logic flow set indicated at 716 is similar to that as the logic flow set indicated at 718 where only 716 will be described in detail with the understanding that such description is relevant to the logic portion 718. The decision at 720 determines whether the port tab is above 50% of the allowed positional ranges for that tab, in which case in order to properly reposition the tab to a more desirable central location, it is lowered to correct this port list, whereby the new position pointer for the port tab indicated in step 722 is decremented by a value which in one form is two tab positional units downwardly. Otherwise, if the port tab is below the 50% mark or another desirable center point type mark, then the starboard tab is indicated to raise two points as indicated by step 724 and 726. Step 724 ensures that the starboard tab can in fact increment two points. In one scenario where the port tab is all the way down and the starboard tab is all the way up, the list simply cannot be corrected because you are at the extreme ranges, and hence no alteration will be incurred. However, absent this rare situation, the tab is corrected and the tab position routine will adjust the tabs accordingly as it runs through that loop.

Turning to another aspect of the trim tab control system, in certain situations a manual override is undertaken and the user wants to limit the upper range and define a upper setting of the tabs because the user is not concerned with speed optimization so much as lowering the bow for more of a level ride. This manual override can occur when the boater desires a better view of the horizon, or for any other reason. For example, given a range of tab positions such as zero for all the way down and fifty for all of the way up, let us say the tabs are down at given number of say ten tab position units and the speed of the water vessel is optimized. Let us presume there is a manual override pushing the tabs downward into the water for further hydroengagement to a tab position of fifteen units which is recorded within the microcontroller 210 by the input lines indicated at 242 in FIG. 5. Thereafter the value fifteen tab position units is the upper limit which is used in a conditional statement within the code so that the tabs will not be adjusted above that level unless the user manually raises the tabs to set the new upper level. In one scenario where only one tab is manually lowered, then the upper limit is the higher limit of the two tabs. For example, if one tab is lowered to fifteen position units and the other to seventeen tab position units, after the user is done meddling with the controls, the upper limit for both is seventeen position units. As shown in FIG. 18 in the lower left hand portion there is a representation of the trim tab positions of the boat. The flags indicated at 359 and 361 indicates the upper range limit where this is automatically adjusted by the helmsman by merely manually positioning the trim tabs down (as indicated by arrow 34 in FIG. 1). The indicators 363 and 365 show the actual tab position where the microcontroller 212 will not allow the position to extend down (be lowered) past the flags 359 and 361.

It should be noted that when the trim tabs are operated, the left and right ones do not move downwardly and upwardly at the same speed. Generally, the fluid path is longer for one or the other, which has more fluid resistance therein, causing a lower fluid rate and speed. The algorithm of the present invention can account for this variation. This correction occurs on the fly where the boat will list and have a certain amount of rotation about the longitudinal axis, and the tilt sensor will thereby correct this rotation naturally.

The tab movement positioning can be done by a variety of other methods, such as using a pulling method which pulls the speed reading in the necessary positions and increments a master variable to determine where the tabs need to be positioned. Additionally, the main routine could actually drive the relays so it doesn't have to be done in an interrupt routine. Further, an object-oriented method could be employed, treating each tab as a particular object that is acted upon by speed inputs. The write system activity log, instead of being exported, could be saved on board in a static memory and then queried later by some device. Different communications could further be employed, such as wireless, Bluetooth, or other methods of communicating with the device for extracting data. Further, other alternatives could include logging the GPS data, whether on board or exported. An alternative embodiment could have the switches disconnected from the trim tabs and connected to the alternate embodiment whereby when a switch is depressed, the controller receives that switch press and then activates the appropriate relays at that time and for the duration of that switch press. So in other words, instead of a vampire tap, the current actually flows through the device and passes therethrough. Although it is advantageous to have a vampire tab situation where this has inherent failsafe properties where the manual operation of the trim tabs will still be invoked in the event that these trim tab controller 20 malfunctions or is inoperable for any reason. Other methods of the watchdog timer as described in detail above could include other delayed timing schemes. Watchdog timers are a very common element in controller-type applications so any embodiment of a watchdog-type timer or any kind of timer that detects that nothing has happened for awhile could be employed.

It should be noted with regard to the watchdog timer that on occasion, present analysis and observation indicates that perhaps an optimum speed is reached, but in time, the vessel may lull to some degree, causing more injury and labor Indicated by reduced RPMs, but not necessarily a decrease in the velocity of the water vessel. Therefore, a slight alteration of the tabs can sometimes pull the boat out of its lull and bring it back to a proper increased velocity and planning more desirable orientation.

It should be also noted that this is a very "fine trimming" where the alterations are very miniscule for very extreme optimal results that are otherwise unattainable without such a trim tab control system 20.

It should be further noted that other methods of making the system configurable include having the configuration information stored on the PC and transferred to the microprocessor on an initialization step using various dip switches to input configuration information, calculate the configuration information based on operational actual data such as watching the speed, recording it, and determining when it came up on plane, and when the vessel dropped off plane.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicant's general concept.

The invention claimed is:

1. A trim tab control system adapted to control left and right trim tabs on a water vessel, the trim tabs adapted to actuate up or down and the water vessel having a longitudinal and lateral axis and a helm with a trim tab control module, the trim tab control system comprising:

a) a microcontroller having a plurality of data input lines and output lines,
b) a control circuit adapted to actuate the left or right trim tabs, the control circuit in communication with at least one of the output lines of the microprocessor,
c) a tilt sensor adapted to determine the amount of tilt about a longitudinal axis of the water vessel,
d) a velocity sensor comprising a GPS unit adapted to transmit signals to a data input line of the microcontroller representing a measured velocity of the water vessel,
e) whereas the microcontroller having logic to condition the signal received from the velocity sensor to determine an actionable velocity value is compared to a previously recorded actionable velocity value, where if the actionable velocity value is greater than the previously recorded actionable velocity value, the trim tabs are actuated in the same direction as the previously set direction; alternatively, if the actionable velocity value is less than the previously recorded actionable velocity value, the trim tabs actuate in the opposite direction than the previous trim tab adjustment direction, where the position of the trim tabs are monitored by the microcontroller from the power line which activates the trim tabs when the trim tabs are repositioned at the trim tab control module.

2. The trim tab control system as recited in claim 1 whereby there is no sensing mechanism to sense the position of the trim tabs, and the position of the trim tabs are solely based upon recording the movements of the same.

3. The trim tab control system as recited in claim 1 where the microcontroller records phases which correlate to measured velocities of the water vessel where a first phase which is set at a low velocity does not allow alteration of the trim tabs on the microprocessor, a planning phase at an intermediate velocity of the water vessel positions the trim tabs at a lowermost position, and an automatic mode phase allows for adjustment of the trim tabs based upon the velocity readings from the velocity sensor to optimize the velocity of the water vessel.

4. The trim tab control system as recited in claim 1 where simultaneous operation of a motor operating the trim tabs in both directions for pressure and retract directions are not allowed by way of an interlock relay circuit.

5. The apparatus as recited in claim 4 where a control circuit provides relays that are adapted to receive signals from the microcontroller to activate a switch to operate valves and a pressure source to operate the trim tabs.

6. The trim tab control system as recited in claim 5 where an array of comparators receive a voltage signal from an electrical line in communication with either the valves or pressure source and the voltage signal is manipulated to be properly received by a data input port of the microprocessor.

7. The trim tab control system as recited in claim 1 where the velocity sensor is an on board GPS circuit adapted to give speed readings to the microprocessor.

8. The trim tab control system as recited in claim 7 where the trim tab control system has an output port adapted to export GPS data from the GPS unit.

9. The trim tab control system as recited in claim 7 where a signal processing a velocity value produced by the velocity sensor includes a boxcar averaging process of the actionable velocity values.

10. The trim tab control system as recited in claim 1 where the velocity sensor comprises a GPS unit—that is external to the trim tab control system and comprises an input port for reading a GPS sensor.

11. The trim tab control system as recited in claim 1 where the trim tab control system comprises a start up routine that measures the initial reading from the tilt sensor to determine a calibrated baseline level reading of the water vessel.

12. The trim tab control system as recited in claim 1 where the microcontroller is adapted to read signals from a data input port based upon activation of electrical lines to the left and right trim tabs where if either of the trim tabs are activated by a source other than the microprocessor, the alteration of the trim tabs is recorded within the microprocessor.

13. The trim tab control system as recited in claim 12 where a trim tab upper limit value is used by the microcontroller to determine the upper setting of the trim tabs where the upper setting is set by the source other than the microcontroller for adjusting the trim tabs.

14. The trim tab control system as recited in claim 1 where if the port and starboard trim tabs are repositioned at different rates or durations, the tilt sensor will correct any list caused by a result of rotation of the boat about the longitudinal axis due to these differing positions of the trim tabs.

15. A method of adjusting port and starboard trim tabs of a water vessel, the method comprising:
integrating a trim tab control system to a water vessel where the trim tab control system is in communication with power lines that control the movement of the left and right trim tabs,
a) employing a microcontroller having a plurality of data input lines and data output lines,
b) employing a velocity sensor employing a GPS system adapted to sense a measured velocity of the water vessel and transmit a signal representing the measured velocity to the microprocessor,
c) reading the signal representing the measured velocity of the water vessel in the microcontroller and engaging in a conditioning step where the signal representing the measured velocity is used to determine if the signal is sufficiently distinct from time adjacent signals for further calculation,
d) utilizing an actionable data value where the actionable data value represents a determined velocity of the water vessel where the data value is compared to a previously recorded actionable data value such that if the data value represents a greater velocity than the previous data value the trim tabs are actuated in a same direction as the previous trim tab adjustment, and if the actionable data value is less than the previously recorded actionable data value, the trim tabs are adjusted in an opposite direction as the previous trim tab adjustment.

16. The method as recited in claim 15 where the conditioning step comprises comparing a measured velocity with adjacent velocities after a boxcar averaging process of the velocities where a larger velocity change following a boxcar averaging process requires less time to create an actionable data value and a smaller measured velocity change requires a larger time difference from the previously actuated value.

17. The method as recited in claim 15 where a tilt sensor is provided and if there is a sufficient degree of tilt about a longitudinal axis of the water vessel, one of the two trim tabs is adjusted in a manner to reposition the water vessel about the longitudinal axis to level of the water vessel.

18. The method as recited in claim 15 where if a user manipulates trim tab controls of the water vessel, the upper setting of the trim tabs is utilized and the microcontroller has a trim tab upper limit where the trim tabs are not positioned above this limit.

19. The method as recited in claim 18 where if the user readjusts the trim tabs above the said upper limit previous value this new setting is the new upper limit imposed upon the microprocessor for the upper allowable adjustable limit for the microprocessor to adjust the trim tabs.

20. The method as recited in claim 15 where an electrical line is in electrical communication with a power line that provides power in order to operate the trim tabs.

21. The method as recited in claim 20 where the electrical line passes electrical current through voltage converters before interfacing with the microprocessor.

22. A method of controlling port and starboard trim tabs on a boat having a longitudinal axis and further having a manual trim tab control interface having manual control lines interfacing with trim tab actuators where the control lines control upward and downward movement of each trim tab, the method comprising:
- a) integrating a trim tab controller having trim tab control lines to the manual control lines of the boat that are in communication with the manual control interface and having the trim tab control lines provide independent control of the trim tabs,
- b) providing a GPS sensor adapted to take GPS readings,
- c) conditioning the GPS readings to form actionable velocity data values of the boat,
- d) adjusting the trim tabs based upon the actionable velocity data values whereby an increase in velocity repositions the trim tabs in the same direction as the last trim tab adjustment and a decrease of the actionable velocity values repositions the trim tabs in the opposite direction as the last trim tab adjustment,
- e) providing a tilt sensor to monitor the rotational position of the boat about the longitudinal axis whereby if the boat rotates about the longitudinal axis and a list develops, a trim tab is repositioned to correct the list,
- f) repositioning the trim tabs after a predetermined time interval following the last trim tab repositioning to ensure the boat is traveling at a more optimal velocity.

23. The method as recited in claim 22 whereby the conditioning of the GPS readings to create an actionable velocity data point of the boat comprises steps of acquiring raw GPS velocity data values and comparing a raw GPS velocity data values over a period of time whereby a smaller raw GPS velocity values over a longer time increment creates an actionable velocity data point and a relatively larger raw GPS velocity values in a relatively shorter time increment creates an actionable velocity data point.

24. The method as recited in claim 22 whereby the manual control interface operates independently of the trim tab controller in the event the trim tab controller fails.

25. The method as recited in claim 22 where a manual adjustment of the trim tabs defines an upper operational limit of the trim tabs for the trim tab controller.

26. The method as recited in claim 22 whereby the control of the trim tabs by the trim tab controller occurs when the boat is in automatic mode phase which is a state of the boat based upon a preset boat velocity.

27. The method as recited in claim 26 whereby the trim tabs are fully retracted when the boat is docked.

28. The method as recited in claim 26 whereby the trim tab controller records the movement of the trim tabs that the trim tab controller initiated as well as movements initiated through the manual trim tab control interface.

29. The method as recited in claim 22 whereby the trim tabs operate in incremental movement to reduce strain on an actuator controlling the port and starboard trim tabs.

30. The method as recited in claim 29 where a manual adjustment of the trim tabs defines an upper operational limit of the trim tabs for the trim tab controller.

31. The method as recited in claim 22 whereby the trim tab controller records the movement of the trim tabs that the trim tab controller initiated as well as movements initiated through the manual trim tab control interface.

32. The method as recited in claim 31 whereby the trim tab controller logs the speed, list and tab corrections.

33. A control system adapted to adjust port and starboard trim tabs on a boat having trim tab data lines in communication with an actuating system to control the port and starboard trim tabs that are in communication with a manual trim tab interface, the control system comprising:
- a) a plurality of control data lines in electrical communication with the trim tab data lines to provide independent control of the actuating system that is adapted to control the port and starboard trim tabs,
- b) a GPS sensor adapted to receive GPS signals,
- c) a microprocessor connected to the control data lines and adapted to supply voltage thereto, the microprocessor adapted to receive signals from the GPS sensor and condition raw GPS data from the GPS sensor whereby the raw GPS data is averaged from time adjacent raw GPS data points and smaller velocity changes occurring over a greater time increment and relatively greater velocity changes over smaller time increments is the criteria for the raw GPS data to produce actionable data points,
- d) whereas the microprocessor determines whether the boat is at a proper minimum velocity to warrant altering the tab position and the microcontroller compares an actionable data point compared to a previously recorded actionable data point and the trim tabs are manipulated to maximize the velocity of the boat.

34. The control system as recited in claim 33 whereby a tilt sensor is in communication with the microprocessor and the microprocessor controls one of the trim tabs of the boat to correct rotation about a longitudinal axis of the boat.

35. The control system as recited in claim 34 where the trim tabs are controlled in incremental movements.

36. The control system as recited in claim 35 whereby a signal from the microprocessor to control the rotation of the boat about the longitudinal axis is at least twice the degree of rotational adjustment of a trim tab then when the microcontroller alters the trim tabs to optimize the velocity of the boat.

37. The control system as recited in claim 33 whereby the microprocessor has an interrupt timer which detects whether a trim tab adjustment has not occurred for a period of time where the microprocessor transmits a signal for a trim tab adjustment.

38. The control system as recited in claim 33 whereby the trim tabs do not have a positional actuator and the position of the trim tabs are recorded in the microprocessor for all movements of the port and starboard trim tabs.

39. The control system as recited in claim 38 whereby the speed, list and tab corrections are recorded for review.

40. The control system as recited in claim 33 whereby the microcontroller compensates for hydrostatic pressure upon the trim tabs when positioning them downwardly.

41. The control system as recited in claim 40 whereby the microcontroller repositions the trim tabs in a incremental movements.

42. The control system as recited in claim 41 whereby operational parameters are stored within the microcontroller.

* * * * *